United States Patent [19]

Murashima et al.

[11] Patent Number: 4,903,134
[45] Date of Patent: Feb. 20, 1990

[54] AUTOMATIC FOCUSING CIRCUIT FOR AUTOMATICALLY MATCHING FOCUS IN RESPONSE TO VIDEO SIGNAL AND ZOOM POSITION

[75] Inventors: Hirotsugu Murashima, Yamatotakada; Satoru Maeda, Hirakata; Shunji Hirano, Takatsuki, all of Japan

[73] Assignee: Sanyo Electric Co., Ltd., Osaka, Japan

[21] Appl. No.: 282,394

[22] Filed: Dec. 9, 1988

Related U.S. Application Data

[62] Division of Ser. No. 120,583, Nov. 13, 1987, Pat. No. 4,841,370.

[30] Foreign Application Priority Data

| Nov. 17, 1986 | [JP] | Japan | 61-273212 |
| Dec. 19, 1986 | [JP] | Japan | 61-304411 |
| Feb. 18, 1987 | [JP] | Japan | 62-34763 |
| Feb. 26, 1987 | [JP] | Japan | 62-43405 |
| Feb. 26, 1987 | [JP] | Japan | 62-43406 |
| Mar. 4, 1987 | [JP] | Japan | 62-49513 |

[51] Int. Cl.$^4$ .................................. H04N 5/232
[52] U.S. Cl. ............................ 358/227; 358/225
[58] Field of Search ............... 358/227, 225, 213.19, 358/213.13

[56] References Cited

U.S. PATENT DOCUMENTS 4,161,756  7/1979  Thomas ......................... 358/227
4,735,494  4/1988  Makino et al. ................. 358/227

Primary Examiner—Jin F. NG
Assistant Examiner—Stephen Brinich
Attorney, Agent, or Firm—Stanger, Michaelson, Reynolds, Spivak & Tobia

[57] ABSTRACT

In an automatic focusing circuit of a video camera, automatic focusing operation is performed by a focus evaluating value formed in response to a video signal obtained by an image sensing circuit (4). A first focusing motor control circuit (15) controls the rotation of a focusing motor (3) so that a focusing lens (1) is once fixed in the position where the focus evaluating value takes the maximum value. A second focusing motor control circuit (17) changes the focusing motor (3), by a predetermined very small amount, to determine the slope of the focus evaluating value, which change is repeated until inversion of the slope, that is, the maximal point is detected. As a result, the position of the focusing lens is corrected at the maximal point of the focus evaluating value. When the correction amount exceeds a predetermined value, first automatic focusing operation by the first focusing motor control circuit (15) is resumed.

15 Claims, 17 Drawing Sheets

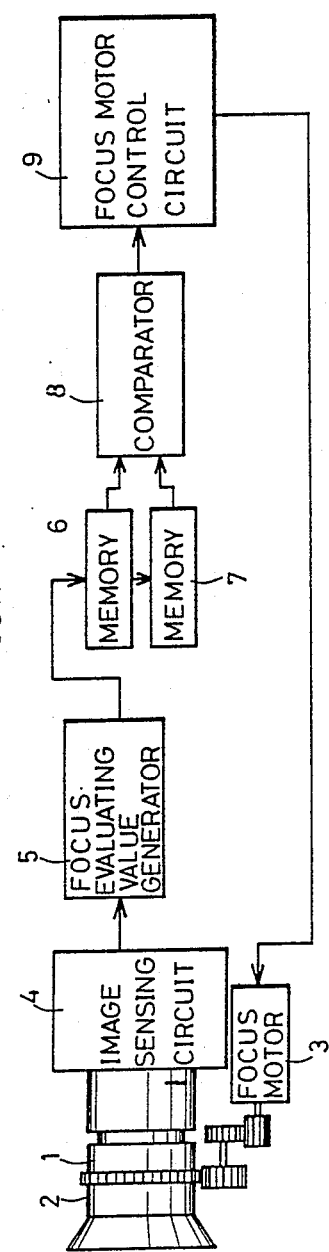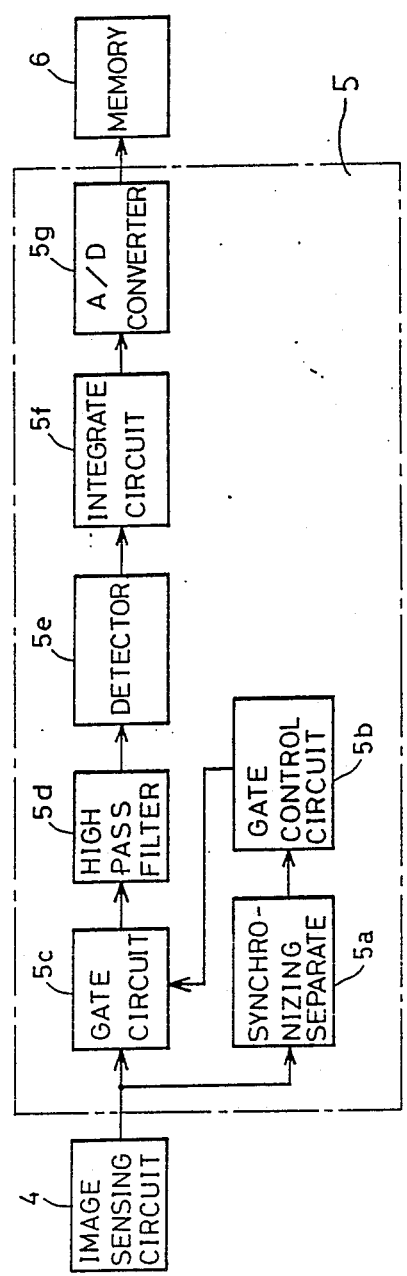

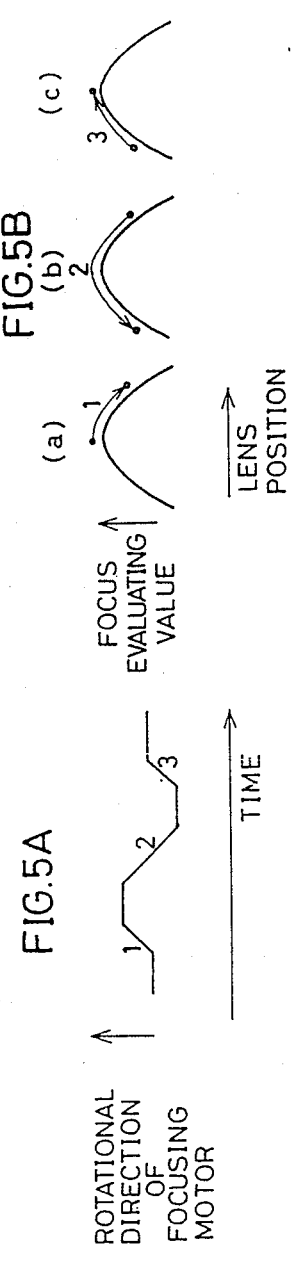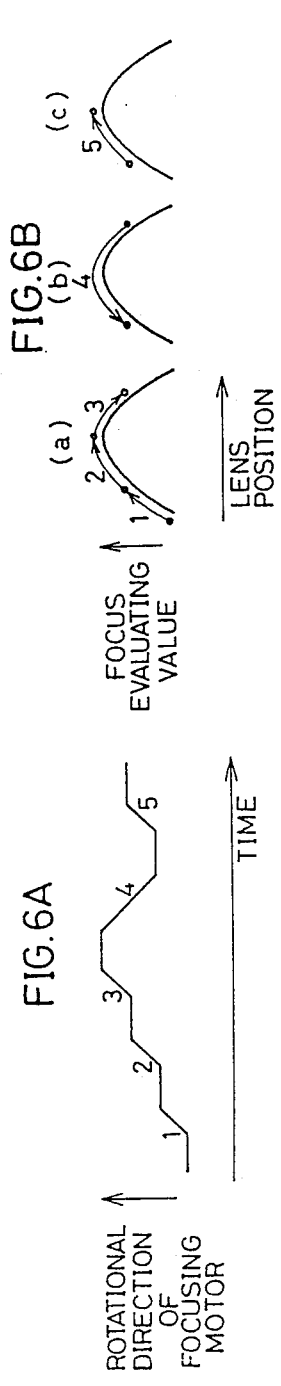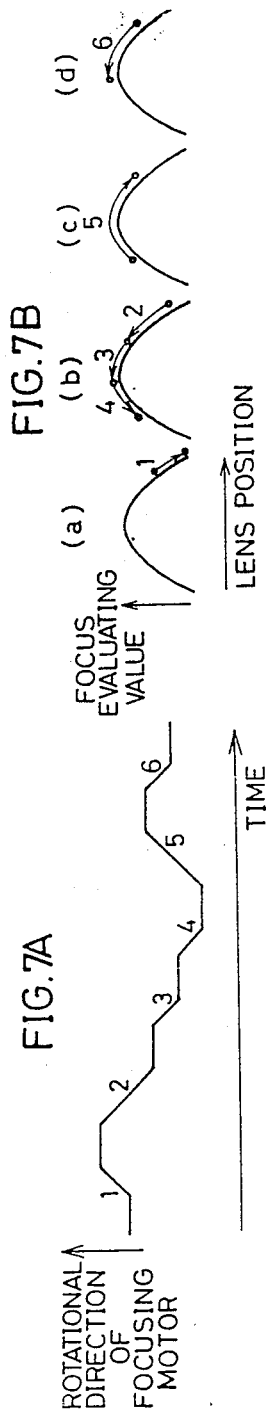

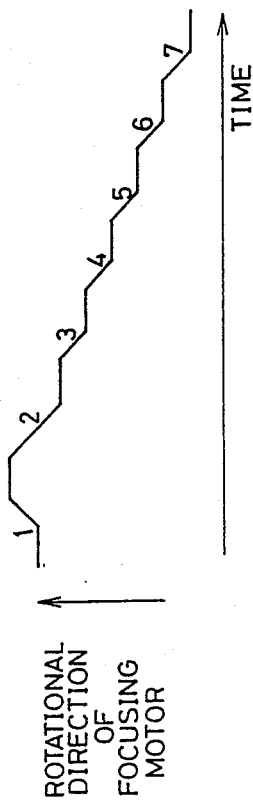
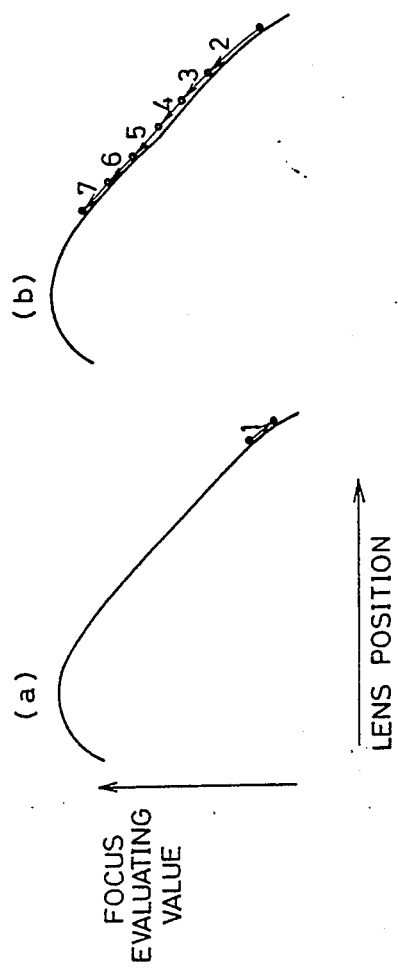

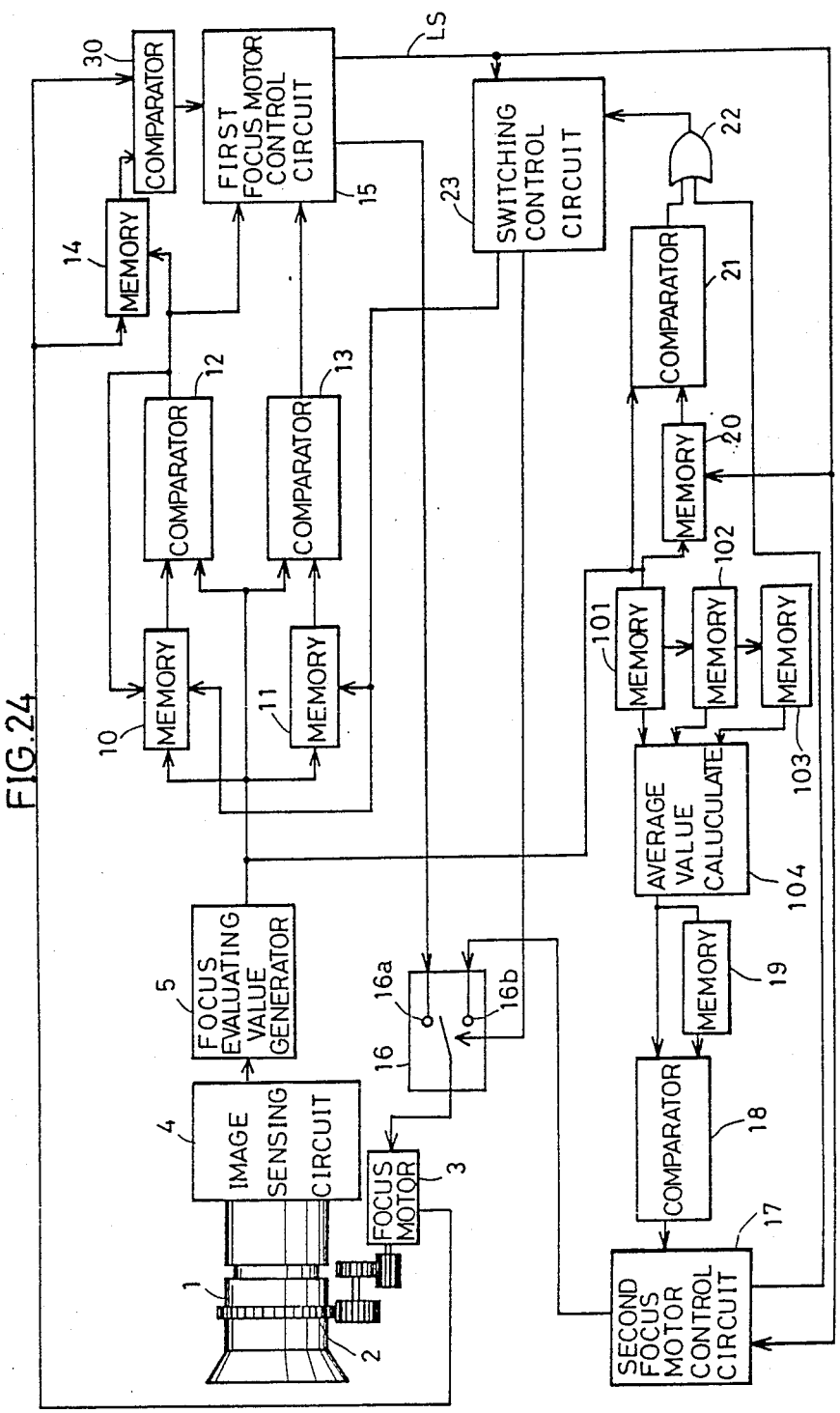

AUTOMATIC FOCUSING CIRCUIT FOR AUTOMATICALLY MATCHING FOCUS IN RESPONSE TO VIDEO SIGNAL AND ZOOM POSITION

This is a division of application Ser. No. 120,583 filed Nov. 13, 1987, now U.S. Pat. No. 4,841,370 issued 6/20/89.

BACKGROUND OF THE INVENTION

1. Field of the Invention

The present invention relates to an automatic focusing circuit and more particularly, to an improvement of an automatic focusing circuit for automatically matching the focus in response to a video signal obtained from an image sensor, in an image sensing apparatus such as a video camera and an electronic still camera having an automatic focusing mechanism.

2. Description of the Prior Art

Conventionally, in an automatic focusing apparatus used in an image sensing apparatus such as a video camera and an electronic still camera, an approach utilizing a video signal itself obtained from an image sensor for evaluating the state where the focus is controlled has been developed. According to such an approach, a lot of good characteristics can be obtained. For example, there exists essentially no parallax. In addition, even if the depth of field is small and an object is located in the distance, the focus can be exactly matched. Furthermore, according to this approach, a specific sensor for automatic focusing need not be separately provided, so that the apparatus is very simple as a mechanism.

As an example of such a focus control method utilizing a video signal, a control method referred to as a so-called hill-climbing servo system has been conventionally known. The hill-climbing servo system is described in, for example, U.S. Pat. No. 4,638,364, U.S. Pat. No. 4,614,975, Japanese Patent Laying-Open Gazette No. 58505/1983 and No. 103776/1985. Briefly stated, a high frequency component of a video signal obtained from an image sensor is detected every one field as a focus evaluating value, the detected focus evaluating value is always compared with a focus evaluating value detected one field before, and the position of a focusing lens continues to be slightly vibrated so that the focus evaluating value always takes the maximal value.

FIG. 1 is a schematic block diagram showing an example of an automatic focusing circuit for a conventional video camera utilizing such a hill-climbing servo system, and FIG. 2 is a block diagram showing the details of a focus evaluating value generator 5 shown in FIG. 1.

Referring to FIGS. 1 and 2, description is made on a conventional automatic focusing circuit using a hill-climbing servo system.

Referring to FIG. 1, a video camera comprises a focusing ring 2 for moving a focusing lens 1, a focusing motor 3 for driving the focusing ring 2, and an image sensing circuit 4 including an image sensor (not shown) such as a CCD (Charge Coupled Device). The focusing lens 1 may be moved by a piezoelectric element instead of a motor. In addition, the image sensor itself (not shown) such as the CCD instead of the focusing lens 1 may be moved.

An image formed on a surface of the image sensor by the focusing lens 1 is converted into a video signal by the image sensing circuit 4 and inputted to the focus evaluating value generating circuit 5. Referring to FIG. 2 showing the details of the focus evaluating value generating circuit 5, a luminance signal component in a video signal outputted from the image sensing circuit 4 is applied to a synchronizing separator circuit 5a and a gate circuit 5c. The synchronizing separator circuit 5a separates a vertical synchronizing signal VD and a horizontal synchronizing signal HD from the inputted luminance signal and applies the same to a gate control circuit 5b. The gate control circuit 5b sets a rectangular sampling area in a central portion of a picture in response to the inputted vertical synchronizing signal VD and horizontal synchronizing signal HD and a fixed output of an oscillator (not shown). The gate control circuit 5b applies a signal for opening or closing a gate every field to the gate circuit 5c so that passage of the luminance signal is permitted only in the range of the sampling area. The gate circuit 5c may be provided anywhere in the former stage of an integration circuit 5f as described below.

Only the luminance signal corresponding to the range of the sampling area is applied to a high-pass filter 5d every field by the gate circuit 5c. The high frequency component of the video signal separated by the high-pass filter 5d is amplitude-detected by a detector 5e, the detected output being applied to the integration circuit 5f. The integration circuit 5f integrates every filed the detected output applied thereto, the integrated output being applied to an A/D converter 5g. The A/D converter 5g converts the integrated value inputted thereto into a digital value and supplies the digital value as a focus evaluating value in the current field. The supplied focus evaluating value is applied to a first memory 6 as described below.

Returning to FIG. 1, a focus evaluating value outputted from the focus evaluating value generating circuit 5 is stored in the first memory 6. When a focus evaluating value in the next field is then outputted from the focus evaluating value generating circuit 5, data stored in the first memory 6 is transferred to a second memory 7. More specifically, the contents of the first memory 6 and the second memory 7 are updated every field, so that the newest focus evaluating value and a focus evaluating value one field before are always stored in the first memory 6 and the second memory 7, respectively. The contents of the two memories 6 and 7 are inputted to a comparator 8 and compared therein. The compared output is applied to a focusing motor control circuit 9.

As a result of comparison by the comparator 8, when the focus evaluating value stored in the first memory 6 is larger than that stored in the second memory 7, the focus evaluating value is increasing, so that the focusing motor control circuit 9 maintains the current rotational direction of the focusing motor 3 in response to an output of the comparator 8. On the other hand, when the focus evaluating value stored in the first memory 6 is smaller than that stored in the second memory 7, the focus evaluating value is decreasing, so that the focusing motor control circuit 9 reverses the rotational direction of the focusing motor 3 in response to the output of the comparator 8. The focusing ring 2 supporting the focusing lens 1 continues to move in the direction of increasing a focus evaluating value by such movement of the focusing motor 3, so that an in-focus state is achieved. After achieving the in-focus state, the focusing ring 2 and the focusing lens 1 continue to be vibrated back and forth in the vicinity of the maximal point of the focus evaluating value.

In the above described hill-climbing servo system, if only the slope of a focus evaluating value is detected, the lens 1 is not stopped in the defocused position by driving the focusing lens 1 in the direction of always increasing the focus evaluating value even if an object is changed, so that very good follow-up characteristics can be achieved.

However, such a hill-climbing servo system suffers from the following significant disadvantage caused by continuing to vibrate the position of the focusing lens.

A first disadvantage is that since the focusing lens is not stopped even in the in-focus state, a picture continues to be vibrated even if an object at rest is in focus. For example, the focal length of a lens currently used in a television camera is changed by rotating the focusing ring, so that the angle of field of a sensed image is changed. Therefore, in the above described system in which the focusing ring continues to be vibrated even in the in-focus state, the object on the picture becomes large or small with a particular period, resulting in a very unclear picture.

A second disadvantage is directed to a power consumption. There are many cases where a home video camera currently utilizes a battery as a power supply due to the portability thereof. When a focusing motor is always driven as in the above described hill-climbing servo system so that the forward rotation and the reverse rotation are repeated, more power is consumed, as compared with when the focusing motor is rotated in a constant direction, due to rash current, so that the time period during which an image can be recorded by using such a battery becomes short.

Additionally, since the focusing ring is always rotated, a problem of wear of a gear occurs, for example.

In order to overcome these disadvantages, there is proposed a system for detecting the maximal point where a focus evaluating value is changed from an increasing tendency to a decreasing tendency by driving a focusing ring in a one-way direction, and returning the focusing ring to the maximal point and stopping the same therein, which is disclosed in Japanese Utility Model Laying-Open Gazette No. 135712/1985. In detecting the maximal value, focus evaluating values are compared every one field, the larger focus evaluating value is always stored as the maximum value, and the maximum value is determined as the maximal value when it is determined that the current focus evaluating value has dropped, by a predetermined threshold value, from the maximum value.

On the other hand, in a video camera, the position of the focus must be changed, following an object which changes momentarily. Even after the lens is once stopped in the in-focus position as described above, hill-climbing operation of the lens must be resumed when the distance between the object and the lens is changed.

Therefore, an approach of determining that an object changed when the focus evaluating value changed, by more than a predetermined threshold value, while the focusing lens is stopped and resuming hill-climbing operation is proposed by one of the inventors of the present invention, which is disclosed in Japanese patent application No. 252545 filed Nov. 11, 1985. According to this approach, the position of the focus can be changed following an object which changes momentarily. On the other hand, this approach suffers from two disadvantages as described below.

It is assumed that an object moves vigorously during hill-climbing operation. In such a case, the focus evaluating value is increased or decreased as the whole in such a manner that increase or decrease of the focus evaluating value concerning the matching of the focus caused by displacement of the focusing lens itself is overlapped with increase or decrease of the focus evaluating value caused by unintentional movement of the hand and movement of an object.

If and when such unintentional movement of the hands and movement of the object are too vigorous, the effect on the focus evaluating value caused thereby becomes dominant. The point where the focus evaluating value is changed from an increasing tendency to a decreasing tendency by unintentional movement of the hands and movement of an object is recognized as the maximal point corresponding to the in-focus position although the focus is not actually matched, so that the focusing lens may be stopped therein. After the lens is stopped in the erroneous maximal point, hill-climbing operation is resumed if the unintentional movement of the hands and the movement of the object are continued, so that extra time may be somewhat required until the focus evaluating value attains the in-focus position. On the contrary, if the unintentional movement of the hands and the movement of the object are stopped and the focus evaluating value is not changed thereafter, the hill-climbing operation is not resumed, so that the lens continues to be stopped in the defocused position.

A second disadvantage is that a threshold value for resuming hill-climbing operation must be decreased to improve the follow-up characteristics of the position of the focus. However, when the threshold value is decreased, the hill-climbing operation is resumed due to slight movement of an object even in the in-focus state, so that the lens moves, resulting in an unclear picture. Therefore, if the threshold value is set large, the possibility that the lens continues to be erroneously stopped in the defocused position is increased.

In order to overcome these two disadvantages, a technique of providing defocused state detecting means for detecting the presence or absence of a particular high frequency component in a video signal and resuming hill-climbing operation when the defocused state is detected is disclosed in Japanese Patent Laying-Open No. 86972/1985.

However, it is difficult, for the following reasons, to exactly determine whether the focus is matched or not depending on the presence or absence of a particular high frequency component. More specifically, there is a variety of distributions of the spacial frequency of an object itself. There usually exist an object including few particular frequency components even when it is in the most suitable in-focus state and an object including sufficiently particular frequency components even when it is not in the most suitable in-focus state. Therefore, in the former object, it is determined that the focus is not matched even if the object is in the most suitable in-focus state, so that a lens is not stopped. On the other hand, in the latter object, if the lens is stopped while the object is in the defocused state to some extent, it is determined that the focus is matched, so that the defocused state is maintained.

Furthermore, when an object is dark, the S/N ratio in the high frequency of a video signal is deteriorated as compared with that in the low frequency thereof, so that it is likely that it is determined that the focus is matched due to the presence of a noise component in the high frequency. In order to avoid this, when the threshold value for determining the presence or absence of a particular high frequency component is increased, there are many cases where the lens is not stopped even if the object is in focus.

As described in the foregoing, in a conventional automatic focusing circuit using a hill-climbing servo system, a lens continues to be vibrated in the in-focus state, resulting in an unclear picture. In addition, if the vibration would be prevented, malfunction that the lens is stopped in the defocused position occurs.

Meanwhile, some video cameras and electronic still camera have both the automatic focusing mechanism and a zoom mechanism. For example, in the zoom mechanism of the video camera, it is known that the depth of field depends on the zoom region, that is, the place where a zoom lens which is a variable-power lens is located between the telephoto position and the wide-angle position. More specifically, if the zoom is located in the wide-angle region, the depth of field becomes large. This means that the in-focus state is easily maintained even if an object slightly moves back and forth from the in-focus position. On the other hand, if the zoom is located in the telephoto region, the depth of field becomes small. This means that it is difficult to maintain the in-focus state.

Thus, if and when the automatic focusing mechanism to fix a focusing lens in the maximal point of the focus evaluating value as described above is used with the above described zoom mechanism, the amount of change of the focus evaluating value is smaller if the zoom is located in the wide-angle region and larger if the zoom is located in the telephoto region, with respect to a predetermined amount of displacement of the focusing lens. Thus, at the time of the above described automatic focusing operation, if a threshold value for determining the maximal point and a threshold value for resuming hill-climbing operation are fixed values, more time is required for detecting the threshold values when the zoom is located in the wide-angle region, as compared with the situation where the zoom is located in the telephoto region, so that it is difficult to perform fast automatic focusing operation.

SUMMARY OF THE INVENTION

Therefore, a primary object of the present invention is to provide an automatic focusing circuit in which a focusing lens is not vibrated when the focus is matched and a picture is clear.

Another object of the present invention is to provide an automatic focusing circuit which can prevent malfunction that the focusing lens is stopped in the defocused state.

Still another object of the present invention is to provide an automatic focusing circuit which can prevent resumption of unnecessary automatic focusing operation.

A further object of the present invention is to provide an automatic focusing circuit capable of performing fast and stable automatic focusing operation irrespective of the zoom region.

Briefly stated, the present invention is directed to an automatic focusing circuit for automatically matching the focus in response to a video signal obtained from image sensing means, the automatic focusing circuit comprising focus evaluating value detecting means for detecting a level of a high frequency component of a video signal every constant period, converting the level into a focus evaluating value which takes the maximum value in the in-focus position or a focus evaluating value which takes the minimum value in the in-focus position and sequentially supplying the converted value. First automatic focusing operation is performed by first control means so that the position of the focusing lens is once fixed in the position where the focus evaluating value takes the maximum value or the minimum value. Thereafter, second automatic focusing operation is performed by second control means so that the position of the focusing lens is changed, by a very small amount, a change of the focus evaluating value relative to the change is detected and the position of the focusing lens is corrected to the maximal point or the minimal point of the focus evaluating value. When the correction amount of the position of the focusing lens by the second control means exceeds a predetermined value, the automatic focusing operation by the first control means is resumed.

In accordance with another aspect of the present invention, an automatic focusing circuit responsive to the change of the focus evaluating value for performing automatic focusing control in a predetermined characteristic so that the focusing lens is held in the in-focus position comprises zoom position detecting means for detecting the zoom position of a zoom lens. The characteristic of the automatic focusing control is switched depending on the zoom position detected by the zoom position detecting means.

A principal advantage of the present invention is that since coarse adjustment and fine adjustment of automatic focusing operation are independently made by two control circuits, the conformity and the stability required for automatic focusing control can be achieved. More specifically, the focusing lens need not continue to be moved in the in-focus position, and the focusing lens can be prevented from erroneously being stopped by the change of the distance between an object and the lens. In addition, since a threshold value for resuming coarse adjustment can be set large, unnecessary automatic focusing operation which affects a picture can be controlled to a minimum.

Another advantage of the present invention is that when the characteristic of automatic focusing control is switched depending on the zoom position of the zoom lens, stable automatic focusing operation can be performed irrespective of the zoom position.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic block diagram showing an example of a conventional automatic focusing circuit;

FIG. 2 is a block diagram showing the details of a focus evaluating value generating circuit 5 shown in FIG. 1;

FIGS. 5A, 5B, 6A, 6B, 7A, 7B, 8A and 8B are graphs for explaining operation of the second focusing motor control circuit 17;

FIG. 24 is a schematic block diagram showing an automatic focusing circuit according to a seventh embodiment of the present invention.

DESCRIPTION OF THE PREFERRED EMBODIMENTS

Figure 3:
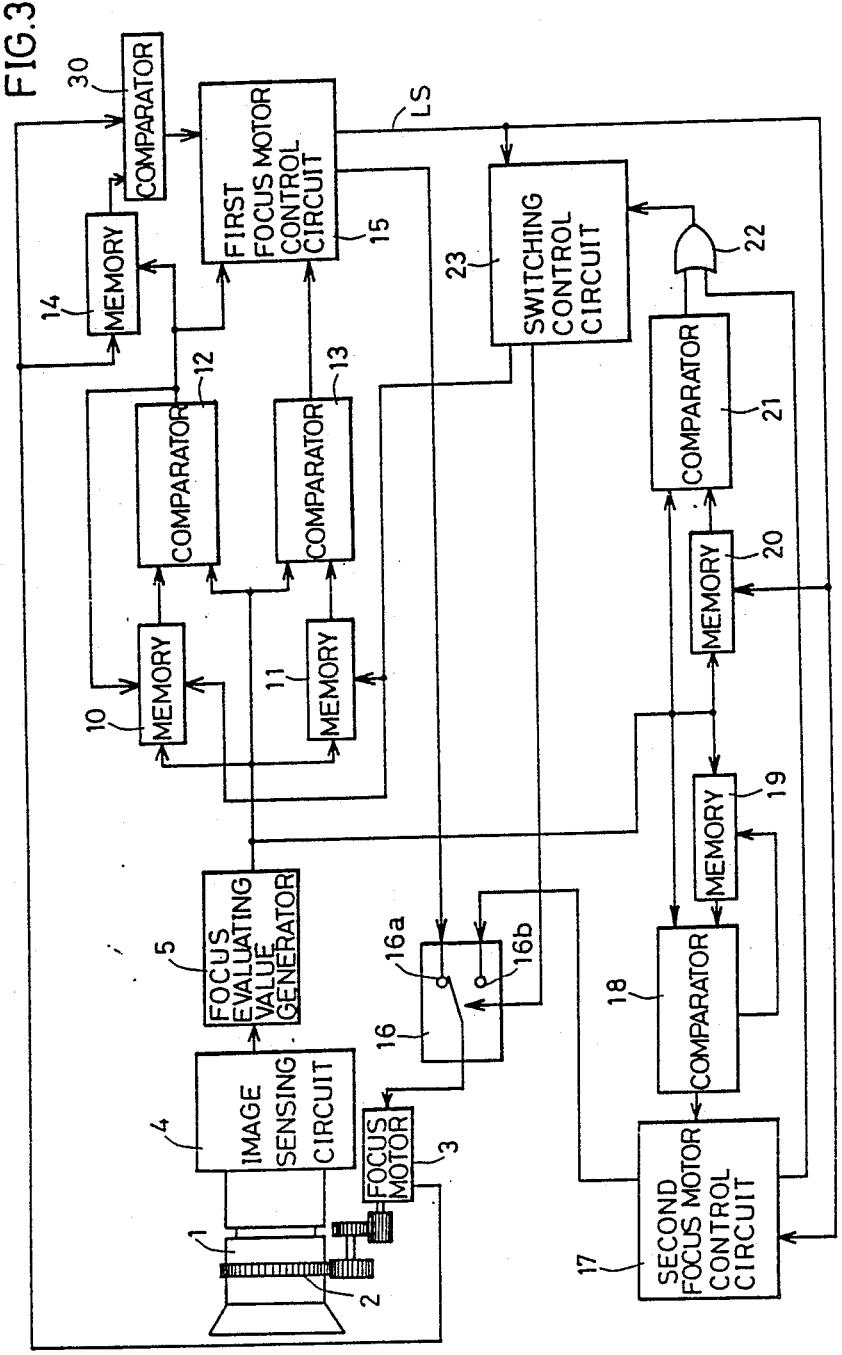
FIG. 3 is a schematic block diagram showing an automatic focusing circuit according to a first embodiment of the present invention.

FIG. 3 is a schematic block diagram of an automatic focusing circuit according to a first embodiment of the present invention.

Referring to FIG. 3, the first embodiment of the present invention is described.

In FIG. 3, a video camera comprises a focusing ring 2 for moving a focusing lens 1, a focusing motor 3 for driving the focusing ring 2, and an image sensing circuit 4 including an image sensor (not shown) such as a CCD. The focusing lens 1 may be moved by a piezoelectric element instead of a motor. In addition, the image sensor itself (not shown) such as the CCD instead of the focusing lens may be moved. An image formed on the image sensor by the focusing lens 1 is converted into a video signal by the image sensing circuit 4 and inputted to a focus evaluating value generating circuit 5. The focus evaluating value generating circuit 5 has the same structure as that in the above described FIG. 2 and therefore, the description thereof is omitted.

A switching circuit 16 is controlled to be switched in response to an output from a switching control circuit 23 as described below. More specifically, when the switching circuit 16 is switched on the side of a terminal 16a, an output from a first focusing motor control circuit 15 as described below is selected and applied to the focusing motor 3, so that rotation of the focusing motor 3 is controlled. On the other hand, when the switching circuit 16 is switched on the side of a terminal 16b, an output from a second focusing motor control circuit 17 as described below is selected and applied to the focusing motor 3, so that the rotation of the focusing motor 3 is controlled.

Description is now made on operation to occur immediately after automatic focusing control is started. It is assumed that the switching circuit 16 is switched on the side of the terminal 16a when automatic focusing operation is started. Immediately after automatic focusing operation is started, a focus evaluating value in the first one field outputted from the focus evaluating value generating circuit 5 is first applied to a memory 10 holding the maximum value and a memory 11 holding the initial value and is held therein. Thereafter, the first focusing motor control circuit 15 rotates the focusing motor 3 in a predetermined direction. Thereafter, a comparator 13 compares the initial focus evaluating value held in the initial value memory 11 with the current focus evaluating value outputted from the focus evaluating value generating circuit 5 and generates a comparison signal. Accordingly, the first focusing motor control circuit 15 initializes the rotational direction of the focusing motor 3 in response to the comparison signal.

More specifically, the first focusing motor control circuit 15 rotates the focusing motor 3 in the above described predetermined direction until the comparator 13 generates a comparison output indicating "large" or "small". If and when a comparison output indicating that the current focus evaluating value is larger than the initial focus evaluating value held in the initial value memory 11 is outputted from the comparator 13, the first focusing motor control circuit 15 maintains the above described predetermined rotational direction. On the other hand, when a comparison output indicating that the current focus evaluating value is smaller than the initial focus evaluating value is obtained, the first focusing motor control circuit 15 reverses the rotational direction of the focusing motor 3. Initialization of the rotational direction of the focusing motor 3 is completed in the above described manner. Thereafter, the first focusing motor control circuit 15 monitors an output of a comparator 12. In order to prevent malfunction due to noise of the focus evaluating value, the comparator 13 may be adapted not to generate a comparison output indicating "large" or "small" while the difference between the initial focus evaluating value and the current focus evaluating value does not exceed a predetermined threshold value.

On the other hand, the comparator 12 compares the maximum focus evaluating value so far held in the maximum value memory 10 with the current focus evaluating value outputted from the focus evaluating value generating circuit 5, and outputs three kinds of comparison signals, that is, signals in first, second and third modes in which the current focus evaluating value is larger than, the same as or slightly lower than, and sufficiently smaller than the focus evaluating value held in the maximum value memory 10, respectively. If and when the current focus evaluating value is larger than the content of the maximum value memory 10, the content of the maximum value memory 10 is updated in response to the output of the comparator 12, so that the maximum value of the focus evaluating value so far is always held in the maximum value memory 10.

A signal indicating the position of a focusing motor is generated from the focusing motor 3 corresponding to the position of the focusing ring 2 supporting the focusing lens 1 and applied to a memory 14 holding the position of a focusing motor. The focusing motor position memory 14 is updated in response to the output of the comparator 12 and always holds a focusing motor position signal in which the focus evaluating value becomes maximum.

The first focusing motor control circuit 15 monitors the output of the comparator 12 while rotating the focusing motor 3 in the direction initialized in response to the output of the comparator 13 as described above. When the comparison output in the third mode in which the current focus evaluating value is sufficiently smaller than the maximum focus evaluating value is obtained from the comparator 12, the first focusing motor control circuit 15 reverses the rotational direction of the focusing motor 3. It is to prevent malfunction due to noise of the focus evaluating value that the focusing motor is first reversed not by the output in the second mode but by the output in the third mode.

After the focusing motor 3 is reversed, a comparator 30 compares the content of the focusing motor position memory 14 corresponding to the maximum value of the focus evaluating value with the current focusing motor position signal generated from the focusing motor 3. When both coincide with each other, that is, the focusing ring 2 is returned to the position where the focus evaluating value is the maximum, the first focusing motor control circuit 15 stops rotation of the focusing motor 3. At the same time, the first focusing motor control circuit 15 outputs a lens stop signal LS and applies the same to the switching control circuit 23 and the second focusing motor control circuit 17.

The switching control circuit 23 is responsive to the lens stop signal LS for controlling the switching circuit 16 to be switched on the side of the terminal 16b. Subsequently, the rotation of the focusing motor 3 is controlled by an output of the second focusing motor control circuit 17.

Control by the second focusing motor control circuit 17 is briefly described. After the focusing motor 3 is once stopped by the first focusing motor control circuit 15, the focusing lens 1 is displaced, by a very small amount, by driving the focusing motor 3 again, the slope of the focus evaluating value is confirmed, and the position of the focusing lens 1 is adjusted in a fine manner so that the focus evaluating value is located in the maximal value.

Figure 4:
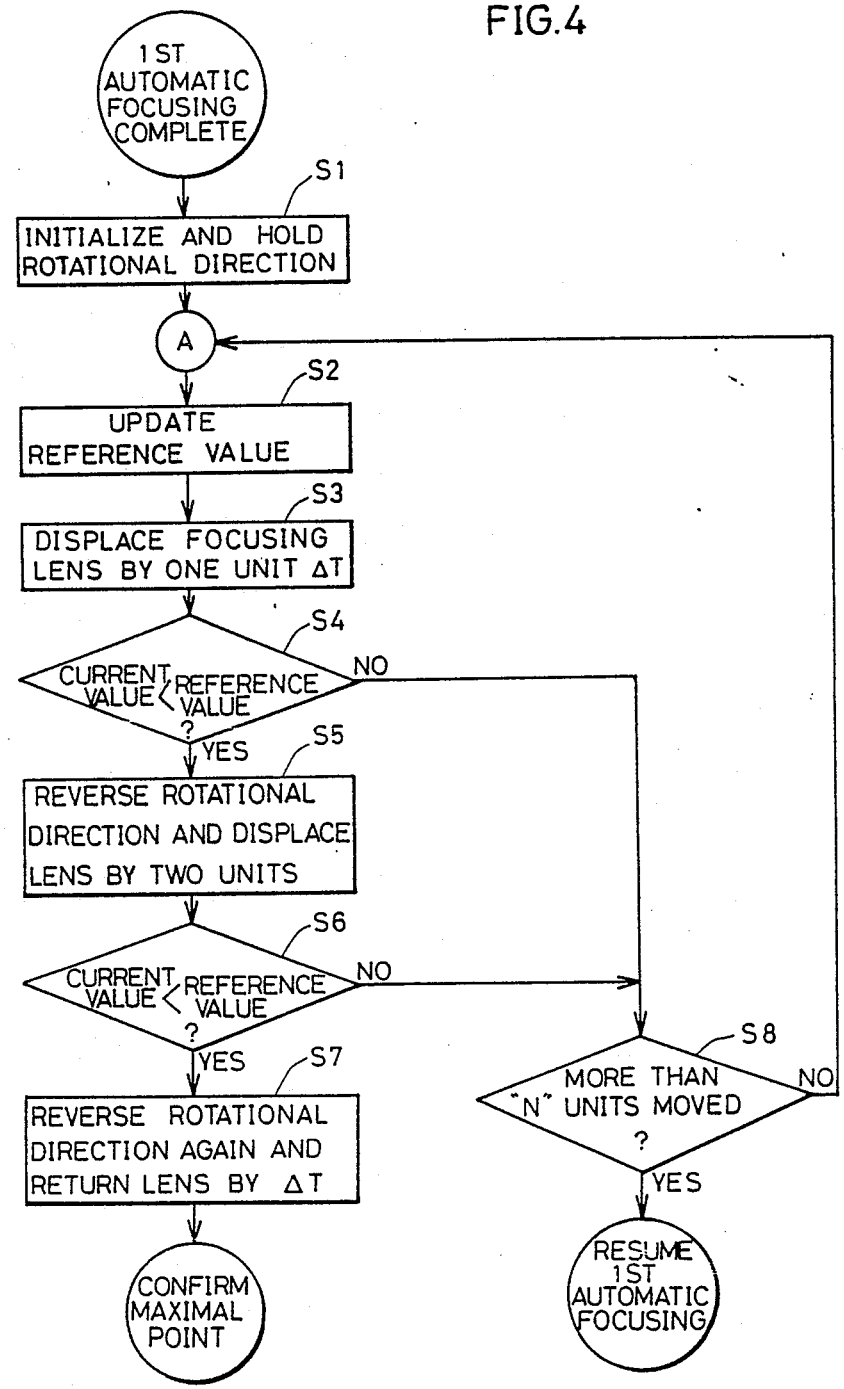
FIG. 4 is a flow chart of internal operation of a second focusing motor control circuit 17 shown in FIG. 3.

Control by the second focusing motor control circuit 17 is now described in detail. The second focusing motor control circuit 17 is formed by a microcomputer. FIG. 4 is a flow chart of internal operation thereof. In addition, FIGS. 5A to 8B are diagrams for explaining the movements of the focusing motor 3 and the focusing lens 1 at the time of control by the second focusing motor control circuit 17. In FIGS. 5A, 6A, 7A, and 8A, the axis of ordinate represents the rotational direction of the focusing motor 3, the forward direction being a direction initialized in a step S1 shown in FIG. 4 as described below. Furthermore, the axis of abscissa represents time. Additionally, in each of (a), (b) and (c) of FIGS. 5B, 6B, 7B and 8B, the axis of ordinate (which is omitted except for (a)) represents a focus evaluating value, and the axis of abscissa (which is omitted except for (a)) represents the position of a lens (the distance between the focusing lens 1 and a CCD).

Referring to FIG. 4, the rotational direction of the focusing motor 3 is initialized (step S1). More specifically, the focusing motor 3 is immediately rotated in a predetermined direction, and the rotational direction is held in the second focusing motor control circuit 17.

Thereafter, the current focus evaluating value outputted from the focus evaluating value generating circuit 5 is held in a memory 19 as a reference value (step S2). As represented by numeral 1 in FIGS. 5A and 5B(a), the focusing motor 3 is rotated, by a very small amount, in the rotational direction held in the above described step S1 (step S3). By the rotation, the focusing lens 1 is displaced, by a very small amount $\Delta T$ (where $\Delta T$ is one unit), in the initialized direction. The very small amount $\Delta T$ of displacement is extremely smaller than the amount of displacement of the focusing lens 1 by the first focusing motor control circuit 15 and hardly affects an image. After very small displacement, a comparator 18 compares the reference value held in the memory 19 in the step S2 with the current focus evaluating value outputted from the focus evaluating value generating circuit 5 (step S4). As represented by numeral 2 in FIGS. 5A and 5B(b), if the current focus evaluating value is smaller, the rotational direction of the focusing motor 3 currently held inside is reversed, and the focusing lens 1 is displaced, by two units, in the reversed direction (step S5).

Then, the comparator 18 compares again the reference value held in the memory 19 with the current focus evaluating value (step S6). As represented by numeral 3 in FIGS. 5A and 5B(c), if the current focus evaluating value is smaller, the rotational direction of the focusing motor 3 is reversed again, and the focusing lens 1 is returned, by one unit, in the reversed direction (step S7). More specifically, control is performed such that the focusing lens 1 is displaced, by a very small amount, back and forth from the position of the lens stopped by the first focusing motor control circuit 15 to such an extent that the image is not affected, it is confirmed that the focus evaluating value in the position of the lens first stopped is the maximal, and the lens is returned to the original stop position and enters the wait state.

Description is now made on the case in which the position of the lens 1 stopped by the first focusing motor control circuit 15 slightly deviates from the maximal value.

Referring to FIG. 4, after the lens 1 is stopped by the first focusing motor control circuit 15, the second focusing motor control circuit 17 initializes the rotational direction of the focusing motor 3 (step S1), and holds the reference value in the memory 19 (step S2). Thereafter, the focusing motor 3 is rotated, by a very small amount, in the direction indicated by the data being held so that the lens 1 is displaced by one unit (step S3), and the current focus evaluating value are compared with the reference value (step S4). Since the stop position of the lens 1 by the first focusing motor control circuit 15 deviates from the maximal value of the focus evaluating value, the current focus evaluating value after very small displacement is larger than the reference value, as represented by numeral 1 in FIG. 6B(a). Internal operation of the second focusing motor control circuit 17 proceeds to the step S8. In the step S8, it is determined whether or not the stop point was moved by more than N units, from the first stop point. Since this determination is concerned with whether or not the stop point considerably deviates from the maximal point, N is set to be a large value to some extent. Thus, in the step S8, determination "NO" is first made, so that the program returns to "A". Then, the content of the memory 19 is updated, and a focus evaluating value in the position after very small displacement which is larger than the focus evaluating value in the first stop point is held as a new reference value (step S2). Thereafter, operation in the steps S3, S4 and S8 is repeated, so that deviation of the first stop point from the maximal point of the focus evaluating value is corrected. For example, in FIGS. 6A and 6B, the lens is displaced by two units as represented by numerals 1 and 2 so that the focus evaluating value attains the maximal point. The subsequent operation represented by numerals 3, 4 and 5 is the same as that represented by numerals 1, 2 and 3 in FIGS. 5A and 5B.

FIGS. 7A and 7B illustrate the case in which the focus evaluating value becomes larger in the direction opposite to the initialized direction. In FIGS. 7A and 7B, the focus evaluating value attains the maximal point by displacing the lens by two units to the left from the first stop position, as represented by numerals 1, 2 and 3. The subsequent operation represented by numerals 4, 5 and 6 is the same as that represented by the numerals 1, 2 and 3 in FIGS. 5A and 5B except that the polarity is inverted.

Although the focusing lens 1 can also attain the maximal point of the focus evaluating value by the second focusing motor control circuit 17 as described above, the amount of each displacement is very small so that a picture is not affected. Thus, if and when the stop point of the lens by the first focusing motor control circuit 15 considerably deviates from the maximal point of the focus evaluating value, much time is required for correcting deviation, so that fast automatic focusing operation can not be expected.

In the step S8 as shown in FIG. 4, it is determined whether or not the maximal point deviates, by a predetermined amount, from the stop point. More specifically, in the step S8, it is determined whether or not correction by very small displacement is made more than N times, that is, the position of the focusing lens 1 is displaced by more than N units. Thus, if and when very small correction is made as shown in FIGS. 5A to 7B and the position is not displaced by more than N units even in any direction from the first stop point of the lens, the program is jumped to "A" in FIG. 4, where the focus continues to be adjusted in a fine manner.

However, in the step S8, when it is determined that the lens 1 moves by more than N units in any direction from the first stop point, the second focusing motor control circuit 17 outputs a signal for confirming that the focus is not matched and applies the same to the switching control circuit 23 through an OR circuit 22. FIGS. 8A and 8B illustrate the case in which the first stop point deviates, by more than N (for example, N=6) units, from the maximal point in such a direction that the lens approaches a CCD. As seen from FIGS. 8A and 8B, a loop from "A" to the step S8 in FIG. 4 is repeated seven times after the rotational direction of the focusing motor 3 is reversed.

The switching control circuit 23 is responsive to the defocused state confirming signal for switching again the switching circuit 16 on the side of the terminal 16a.

Accordingly, the focusing motor 3 is controlled by an output of the first focusing motor control circuit 15 instead of an output of the second focusing motor control circuit 17, so that fast automatic focusing operation by large displacement of the lens is performed.

On the other hand, a memory 20 and a comparator 21 are circuits for resuming coarse adjustment by the first focusing motor control circuit 15 when an object is changed during fine adjustment by the second focusing motor control circuit 17. More specifically, a focus evaluating value at the time point when automatic focusing operation by the first focusing motor control circuit 15 is completed and the lens stop signal LS is generated is held in the memory 20. The comparator 21 compares the content of the memory 20 with the current focus evaluating value outputted from the focus evaluating value generating circuit 5. When the difference becomes larger than a predetermined threshold value, a signal indicating that an object change is outputted assuming that an object changed. The signal is inputted to the switching control circuit 23 through the OR circuit 22. Accordingly, the switching control circuit 23 switches the switching circuit 16 on the side of the terminal 16a. As the result, automatic focusing operation by the first focusing motor control circuit 15 is resumed, so that automatic focusing operation following the change of an object is achieved.

In the above described first embodiment, when it is confirmed by the second focusing motor control circuit 17 that the stop point of the lens 1 by the first focusing motor control circuit 15 is the maximal point, the focusing motor 3 continues to be stopped until the change of the object is determined by the above described comparator 21. However, if the maximal point is intermittently and repeatedly confirmed by the second focusing motor control circuit 17 at a particular interval irrespective of the result of comparison made by the comparator 21, the reliability of automatic focusing operation is further increased.

As described in the foregoing, according to the first embodiment of the present invention shown in FIG. 3, coarse adjustment and fine adjustment of automatic focusing are independently made by the two focusing motor control circuits. Thus, since fast automatic focusing operation is performed by the first focusing motor control circuit 15 so that the lens is stopped, the lens need not continue to be moved in the in-focus state. Even if the lens is stopped in the defocused position by vigorous movement of an object during automatic focusing operation by the first focusing motor control circuit 15, the position of the lens is adjusted in a fine manner by the second focusing motor control circuit 17. In addition, if deviation is large, fast automatic focusing operation is resumed again by the first focusing motor control circuit 15. Furthermore, when the lens is stopped in the true in-focus position, the movement of the lens is only very small displacement by the second focusing motor control circuit 17, so that an image is not affected significantly. Additionally, when it is determined by the comparator 21 that the object changed, automatic focusing operation is resumed by the first focusing motor control circuit 15. However, since fine adjustment is separately made by the second focusing motor control circuit 17, the threshold value for the resuming automatic focusing operation by the control circuit 15 can be set large, so that unnecessary automatic focusing operation which affects a picture can be controlled to a minimum.

Figure 9:
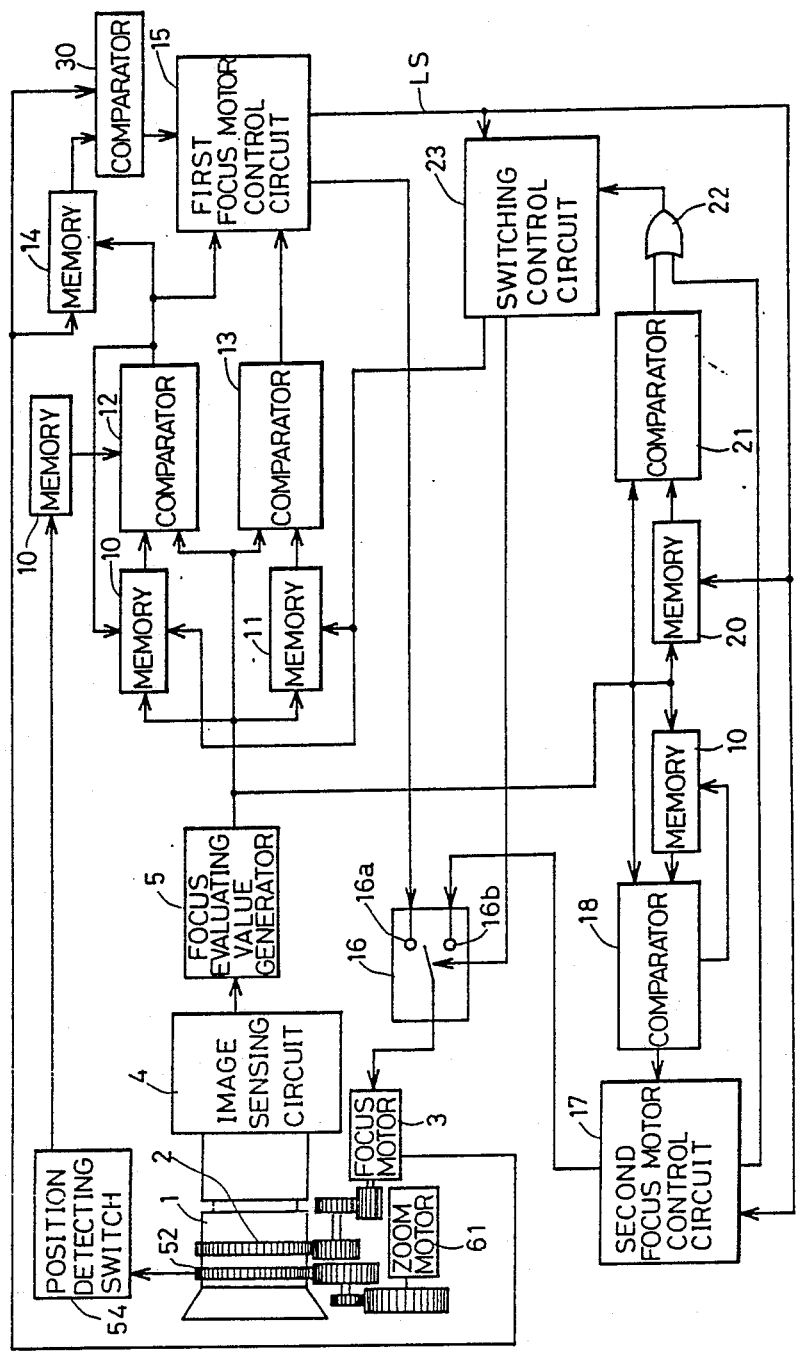
FIG. 9 is a schematic block diagram showing an automatic focusing circuit according to a second embodiment of the present invention.

FIG. 9 is a schematic block diagram of an automatic focusing circuit according to a second embodiment of the present invention. The automatic focusing circuit shown in FIG. 9 is the same as that in the first embodiment shown in FIG. 3 except for the following. More specifically, a video camera show in FIG. 9 has both an automatic focusing mechanism and a zoom mechanism, and comprises a zoom ring 52 for supporting a zoom lens (not shown), a zoom motor 61, a position detecting switch 54 for detecting the zoom region, and a threshold value setting memory 60 connected to the position detecting switch 54.

Figure 10:
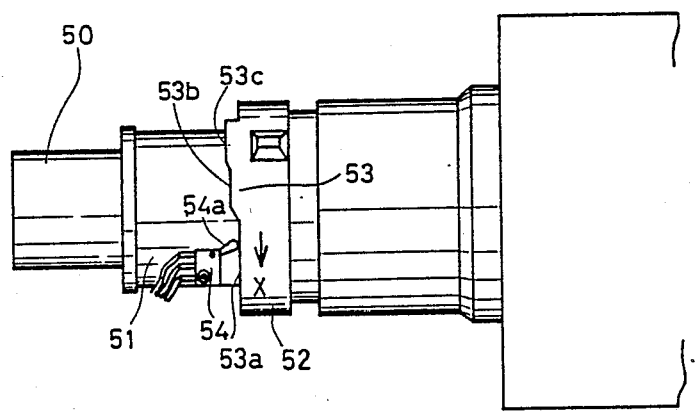
FIG. 10 is a diagram showing a structure of a zoom ring portion shown in FIG. 9.
Figure 11:
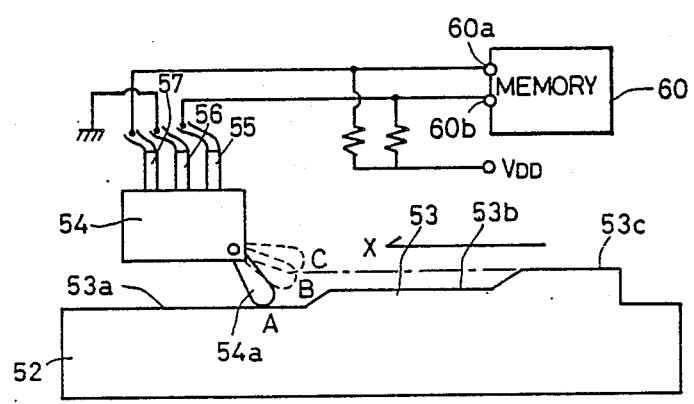
FIG. 11 is a diagram for explaining a structure and a connecting relation of a position detecting switch 54 shown in FIG. 9.

FIG. 10 is a diagram showing a structure of a zoom ring portion shown in FIG. 9, and FIG. 11 is a diagram showing the details of the position detecting switch 54. In FIG. 10, a zoom ring 52 supporting a zoom lens (not shown) which is a variable-power lens is rotatably provided in the radial direction in a lens cylinder 51 projected forward from a main body 50 of a video camera. Since the zoom ring 52 is driven by the zoom motor 61 (in FIG. 9) and rotated, the variable-power lens moves in the direction of an optical axis and on the telephoto or wide-angle side.

A cam portion 53 is integrally formed in a forward end of the periphery of the zoom ring 52, the cam portion 53 comprising a first stepped portion 53a, a second stepped portion 53b and a third stepped portion 53c, each having gradually different amounts projected forward. The position detecting switch 54 is fixed to the lens cylinder 51 so that an operating rod 54a abuts on the cam portion 53. The position detecting switch 54 is a triple changeover switch, which is switched in three steps when the operating rod 54a sequentially abuts on the first stepped portion to the third stepped portion 53a, 53b and 53c. An output of the position detecting switch 54 is supplied to the threshold value setting memory 60, so that signals are processed. A comparator 12 (in FIG. 9) generates three kinds of comparison outputs in first, second and third modes, as in the above described first embodiment. Particularly, if and when a drop of the current focus evaluating value from the content of the maximum value memory 10 exceeds a threshold value outputted from the threshold value setting memory 60, the signal in the third mode is outputted.

More specifically, a first threshold value N1, a second threshold value N2 and a third threshold value N3 are stored in advance in the threshold value setting memory 60. Any of the three kinds of threshold data is selectively outputted in response to the output of the position detecting switch 54.

When the zoom ring 52 is located on the wide-angle side, that is, the operating rod 54a abuts on the first stepped portion 53a and located in a first position represented by a solid line A (in FIG. 11), terminals 55 and 56 are rendered conductive, so that information indicating the rotational position at "H" and "L" levels are supplied to input terminals 60a and 60b of the threshold value setting memory 60, respectively. The threshold value setting memory 60 is responsive to the rotational position information for outputting the first threshold value N1 and applying the same to the comparator 12.

When the zoom ring 52 rotates in the direction represented by an arrow X in FIGS. 10 and 11, that is, on the telephoto side, the operating rod 54a slides along the cam portion 53 and abuts on the second stepped portion 53b. More specifically, the operating rod 54a moves to a second position represented by a dotted line B (in FIG. 11). As a result, terminals 55 and 57 are rendered conductive, so that rotational position information at the "H" and "H" levels are supplied to the input terminals 60a and 60b of the threshold value setting memory 60, respectively. The threshold value setting memory 60 is responsive to the rotational position information for outputting the second threshold value N2 and applying the same to the comparator 12.

When the zoom ring 52 further rotates on the telephoto side, the operating rod 54a abuts on the third stepped portion 53c. More specifically, the operating rod 54a moves to a third position represented by a dotted line C (FIG. 11). As a result, the terminals 56 and 57 are rendered conductive, so that rotational position information at "L" and "H" levels are supplied to the input terminals 60a and 60b of the threshold value setting memory 60, respectively. The threshold value setting memory 60 is responsive to the rotational position information for outputting the third threshold value N3 and applying the same to the comparator 12.

A first focusing motor control circuit 15 monitors the output of the comparator 12 while rotating a focusing motor 3 in the direction initialized in response to an output of a comparator 13, as in the above described first embodiment. In order to prevent malfunction due to noise of a focus evaluating value, the first focusing motor control circuit 15 reverses the focusing motor 3 when it is determined that a drop of the current focus evaluating value from the maximum focus evaluating value exceeds the threshold value outputted from the threshold value setting memory 60.

Figure 12:
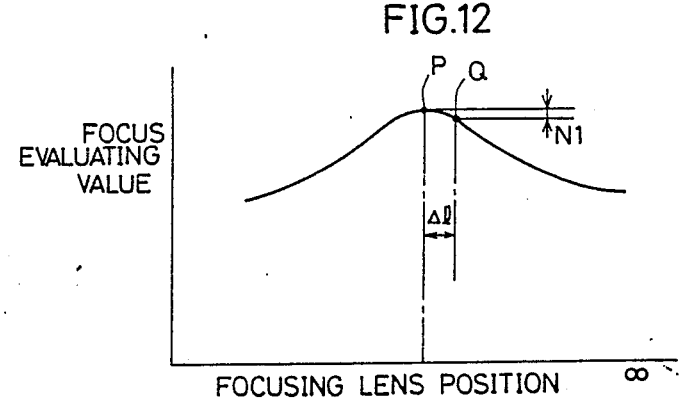
FIGS. 12, 13, and 14 are graphs for explaining timing for reverse rotation of a focusing motor 3 shown in FIG. 9.
Figure 13:
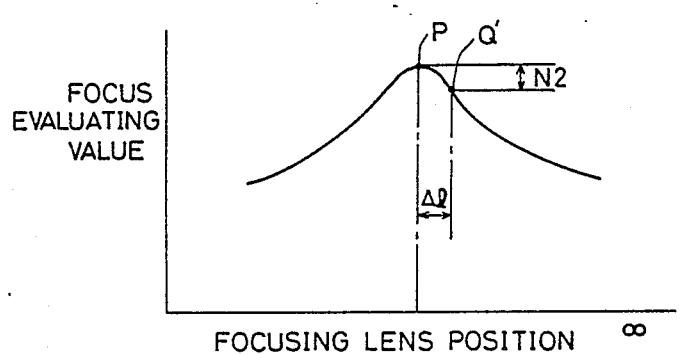
Figure 14:
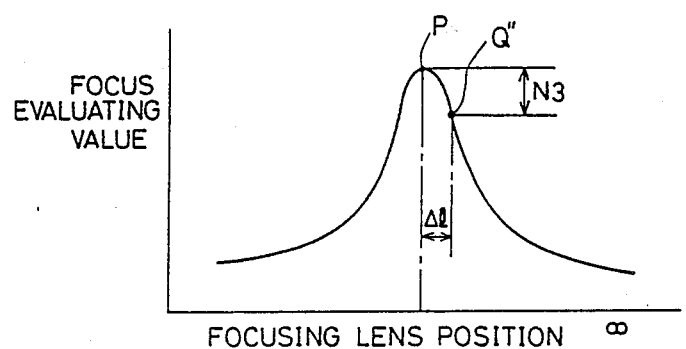

FIGS. 12 to 14 are diagrams for explaining timing for reversing the focusing motor 3. FIG. 12 illustrates the case in which a zoom is located in a wide-angle region, FIG. 13 illustrates the case in which the zoom is located in an intermediate region, and FIG. 14 illustrates the case in which the zoom is located in the telephoto region. In FIGS. 12 to 14, the axis of abscissa represents the position of a focusing lens and the axis of ordinate represents the focus evaluating value.

Referring now to FIG. 12, when a variable-power lens is located on the wide-angle side, the depth of field becomes large, so that the change of the focus evaluating value relative to variation of the position of the focusing lens is decreased. However, in this case, since the first threshold value N1 outputted from the threshold value setting memory 60 is set extremely small, the focusing motor 3 is reversed at a point Q overshot from an in-focus position P by distance $\Delta l$.

Referring now to FIG. 13, when the variable-power lens is located between the wide-angle side and the telephoto side, the second threshold value N2 outputted from the threshold value setting memory 60 is set to be larger than the above described first threshold value N1. Therefore, as shown in FIG. 13, the focusing motor 3 is reversed at a point Q' overshot from the in-focus position P by distance $\Delta l$.

Referring now to FIG. 14, when the variable-power lens is located on the telephoto side, the depth of field becomes small, so that the change of the focus evaluating value relative to variation of the position of the focusing lens is increased. However, in this case, since a third threshold value N3 outputted from the threshold value setting memory 60 is set to be larger than the first threshold value N1 and the second threshold value N2, the focusing motor 3 is reversed at a point Q'' overshot from the in-focus position P by distance $\Delta l$.

Since the first to third threshold values have the relation $N1<N2<N3$ as described above, the focusing motor 3 is reversed at a point overshot from the in-focus position by distance $\Delta l$ even if the zoom region is located in any of the wide-angle region, the intermediate region and the telephoto region.

After the focusing motor 3 is reversed, a comparator 30 compares the content of a focusing motor position memory 14 corresponding to the maximum value of the focus evaluating value with the current focusing motor position signal generated from the focusing motor 3. When both coincide with each other, that is, a focusing ring 2 is returned to the position where the focus evaluating value is the maximum, the first focusing motor control circuit 15 stops the rotation of the focusing motor 3. At the same time, the first focusing motor control circuit 15 outputs a lens stop signal LS and applies the same to a switching control circuit 23 and a second focusing motor control circuit 17. The switching control circuit 23 is responsive to the lens stop signal LS for controlling a switching circuit 16 to be switched on the side of a terminal 16b. Thereafter, the focusing motor 3 is controlled by an output of the second focusing motor control circuit 17. The following operation is the same as that in the above described first embodiment described referring to FIGS. 3 to 8 and therefore, the description thereof is omitted.

As described in the foregoing, according to the second embodiment of the present invention shown in FIGS. 9 to 14, since a threshold value for detecting the maximal value of the focus evaluating value is switched depending on the rotational position of the zoom ring supporting the zoom lens, the in-focus position is quickly detected even if the zoom region changes, so that fast and stable automatic focusing operation can be achieved.

Meanwhile, according to the above described first and second embodiments, the conformity of automatic focusing operation is improved by the first focusing motor control circuit 15 and the in-focus point is confirmed in a fine manner by the second focusing motor control circuit 17 in the vicinity of the in-focus position, so that the stability is improved. When the focus evaluating value does not attain the maximal value even if correction by very small displacement is made more than N times, the focusing motor control circuit 17 determines that the maximal point considerably deviates from the stop point and outputs a defocused state confirming signal, so that fast automatic focusing operation by the first focusing motor control circuit 15 is started. Thus, setting of the above described N performs a very important function for performance of automatic focusing operation.

Figure 15:
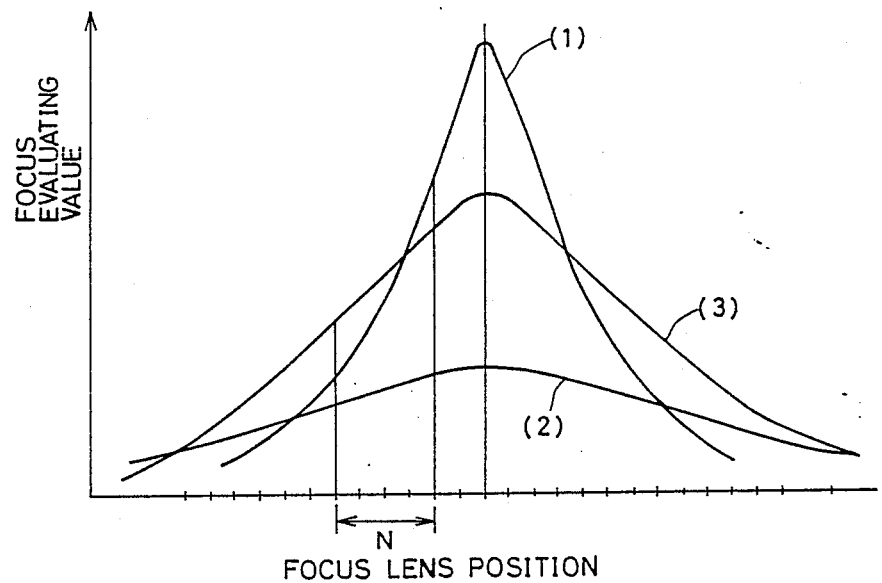
FIG. 15 is a graph showing the relation between the number of times of very small displacement of the position of a focusing lens and the focus evaluating value.

As shown in the above described second embodiment, in a video camera comprising a zoom mechanism, the shape of the change of the focus evaluating value extremely differs depending on whether the same object is recorded in the telephoto mode or the wide-angle mode. FIG. 15 is a diagram showing the relation between the change of the focus evaluating value relative to the position of the zoom ring and the number of steps in peak confirming operation at the time of fine adjustment by the second focusing motor control circuit 17. In FIG. 15, the axis of ordinate represents the focus evaluating value and the axis of abscissa represents the position of the lens. More specifically, the scale shows diagrammatically the amount of each displacement of the position of the lens by the second focusing motor control circuit 17. In FIG. 15, (1) shows the change of the focus evaluating value in the telephoto mode and (2) shows the change of the focus evaluating value in the wide-angle mode. As described with reference to the second embodiment, in the telephoto mode (1), the focus evaluating value changes steeply. On the other hand, in the wide-angle mode (2), the focus evaluating value changes very slowly. As seen from FIG. 15(2), in the wide-angle mode, since the focus evaluating value hardly changes even if the lens is displaced several times, malfunction is liable to occur due to noise. Therefore, N must be set large. On the other hand, in the telephoto mode (1), since the amount of change of the focus evaluating value relative to the amount of each displacement of the lens is large, the conformity of automatic focusing operation is deteriorated if N is set large. Therefore, as shown in FIG. 15(3), it is considered that the value N is set assuming a curve of a focus evaluating value corresponding to the intermediate region of the zoom.

However, on the general condition of recording an image, there are many cases where the depth of field is so large that matching of focus is not required, and the stability of a picture is strongly required in the wide-angle region. On the other hand, in the telephoto region, since the picture is extremely changed by a little change of an object, the follow-up characteristic is strongly required. Thus, if N is set to the above described medium value, malfunction due to noise is liable to occur in the wide-angle region and the follow-up characteristic is deteriorated in the telephoto region.

Figure 16:
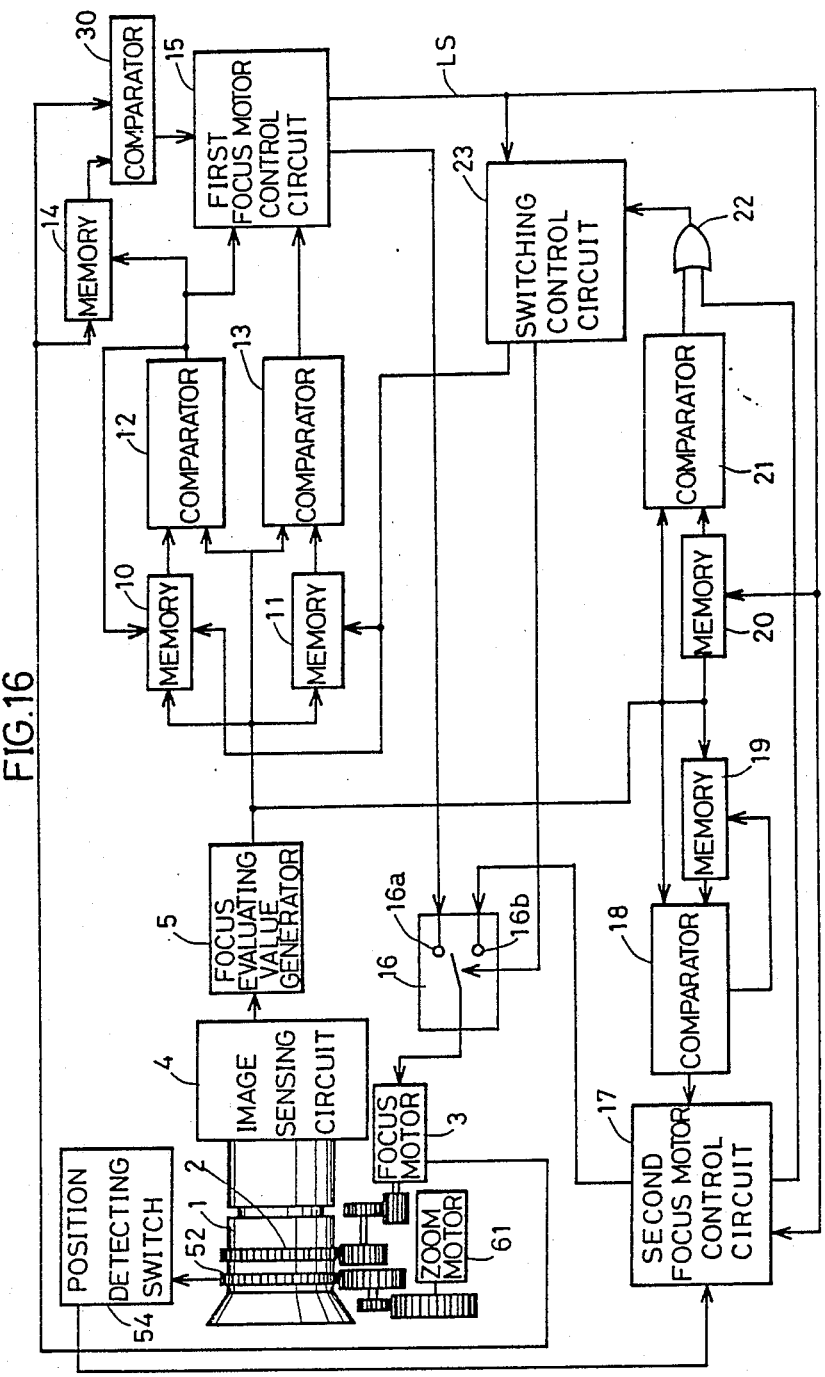
FIG. 16 is a schematic block diagram showing an automatic focusing circuit according to a third embodiment of the present invention.

FIG. 16 is a schematic block diagram of an automatic focusing circuit according to a third embodiment of the present invention, which object is to solve the above described problems. The automatic focusing circuit shown in FIG. 16 is the same as that in the second embodiment shown in FIG. 9 except for the following. More specifically, the threshold value setting memory 60 shown in FIG. 9 is not provided, and an output of a position detecting switch 54 is applied to a second focusing motor control circuit 17 instead of the threshold value setting memory 60. In addition, a zoom ring 52 shown in FIG. 16 is the same as that in the second embodiment shown in FIG. 10 and therefore, the detailed description thereof is omitted. Furthermore, FIG. 17 is a diagram for explaining the position detecting switch 54 and a connecting relation thereof shown in FIG. 16.

Figure 17:
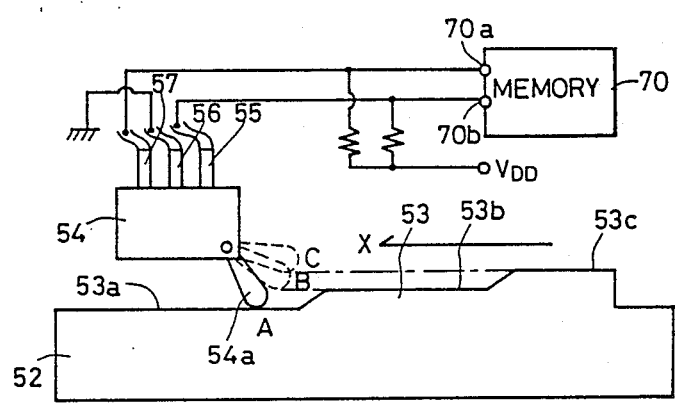
FIG. 17 is a diagram showing a connecting relation of a position detecting switch 54 in the third embodiment shown in FIG. 16.

In FIG. 17, when the zoom ring 52 is located on the wide-angle side, that is, an operating rod 54a abuts on a first stepped portion 53a and located in a first position represented by a solid line A (in FIG. 17), terminals 55 and 56 are rendered conductive, so that rotational position information at "H" and "L" levels are supplied to input terminals 70a and 70b of a threshold value memory 70 included in a second focusing motor control circuit 17, respectively, whereby it can be known that a zoom is located in the wide-angle region.

When the zoom ring 52 rotates in the direction represented by an arrow X in FIGS. 10 and 17, that is, on the telephoto side, the operating rod 54a slides along a cam portion 53 and abuts on a second stepped portion 53b. More specifically, the operating rod 54a moves to a second position represented by a dotted line B (in FIG. 17). As a result, terminals 55 an 57 are rendered conductive, so that rotational position information at the "H" and "H" levels are supplied to the input terminals 70a and 70b of the threshold value memory 70, respectively, whereby it can be known that the zoom is located in the intermediate region.

When the zoom ring 52 further rotates on the telephoto side, the operating rod 54a abuts on a third stepped portion 53c. More specifically, the operating rod 54a moves to a third position represented by a dotted line C (in FIG. 17). As a result, terminals 56 and 57 are rendered conductive, so that rotational position information at the "L" and "H" levels are supplied to the input terminals 70a and 70b of the threshold value memory 70, respectively, whereby it can be known that the zoom is in the telephoto region.

Figure 18A:
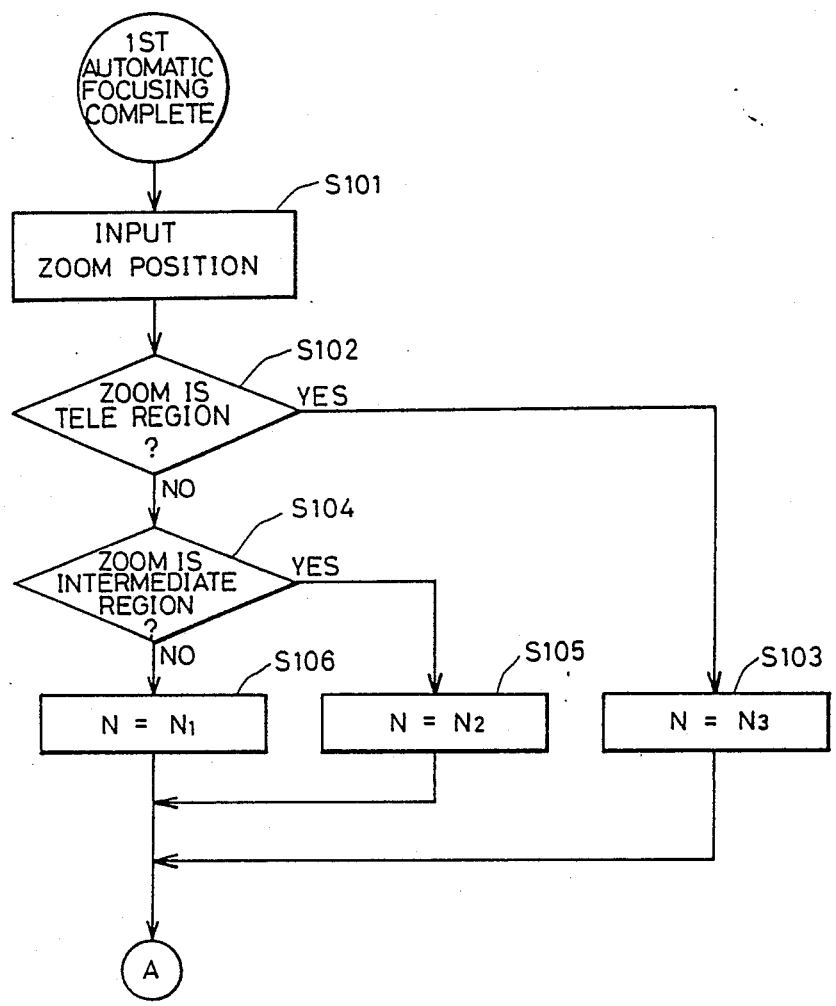
FIGS. 18A and 18B are flow charts of internal operation of a second focusing motor control circuit 17 in the third embodiment shown in FIG. 16.
Figure 18B:
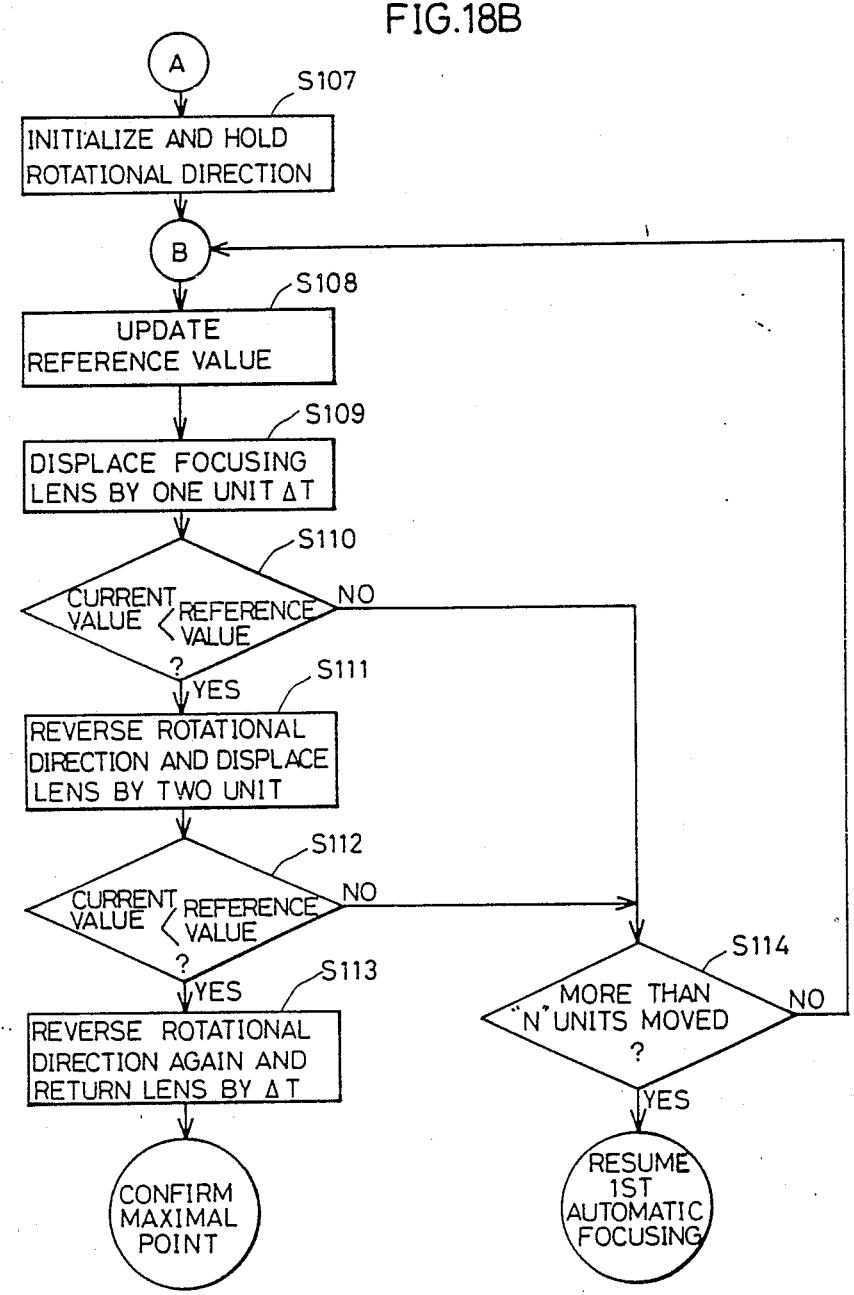

The second focusing motor control circuit 17 starts second automatic focusing operation in response to a signal indicating the above described zoom region. The second focusing motor control circuit 17 is formed by a microcomputer, similarly to the first and second embodiments. FIGS. 18A and 18B are flow charts of internal operation thereof.

Referring to FIG. 18A, when automatic focusing operation by a first focusing motor control circuit 15 is completed, the second focusing motor control circuit 17 is responsive to a signal from the position detecting switch 54 (step S101) for determining the zoom position and determining the number of times of searching the in-focus state. It is first determined whether or not the zoom is located in the telephoto region (step S102). If it is located in the telephoto region, N is set to be equal to $N_3$ (step S103). If it is not located in the telephoto region, it is determined whether or not it is located in the intermediate region (step S104). If the zoom is located in the intermediate region, N is set to be equal to $N_2$ (step S105). In addition, if the zoom is not located in the intermediate region, it is automatically determined that the zoom ring 52 is located in the wide-angle region, so that N is set to be equal to $N_1$ (step S106).

As described in the foregoing, when setting of the value N is completed, the rotational direction is initialized (step S107 in FIG. 18B), as in the first embodiment. Thereafter, peak confirming operation is performed in the same procedure as that in the above described FIG. 4. More specifically, operation in the steps S107 to S114 in FIG. 18B is the same as that in FIG. 4 and therefore, the description thereof is omitted.

Setting of the value N is setting of the number of repetitions of confirmation of a peak in the step S114. For example, the value N is set so that $N_1$ equals 8, $N_2$ equals 6 and $N_3$ equals 4. The value $N_2$ is the same as that in the first embodiment. The value N is set small in the telephoto region and the value N is set large in the wide-angle region. More specifically, in the telephoto region where the focus evaluating value is liable to extremely change as shown in FIG. 15 (1), it is determined that the maximal point considerably deviates from the stop point if the in-focus state is not achieved by performing confirming operation of the peak four times, so that first automatic focusing operation is resumed. On the other hand, in the wide-angle region where the focus evaluating value does not change very much as shown in FIG. 15 (2), the first automatic focusing operation is not resumed until the confirming operation of the peak is performed eight times.

As described in the foregoing, according to the third embodiment, in the telephoto region where an image changes remarkably and the conformity is required, only a few searching operation are required and then, the first automatic focusing operation is started. On the other hand, in the wide-angle region where the image does not change very much and the stability is required, a number of searching operations are required, the number of which is twice the number of times in the telephoto region and then, the first automatic focusing operation is started. As a result, the unstability and malfunction in the telephoto and wide-angle regions can be solved.

Furthermore, the above described number N of repetitions of confirmation of a peak should be set in consideration of resolution of an image sensing optical system including an image sensor, the depth of focus of a lens and the S/N ratio of a video circuit. In addition, although in the above described third embodiment, the zoom region is divided into three regions, that is, a telephoto region, an intermediate region and a wide-angle region, the zoom region may be divided into more than three regions depending on an optical system and a circuit system.

Figure 19:
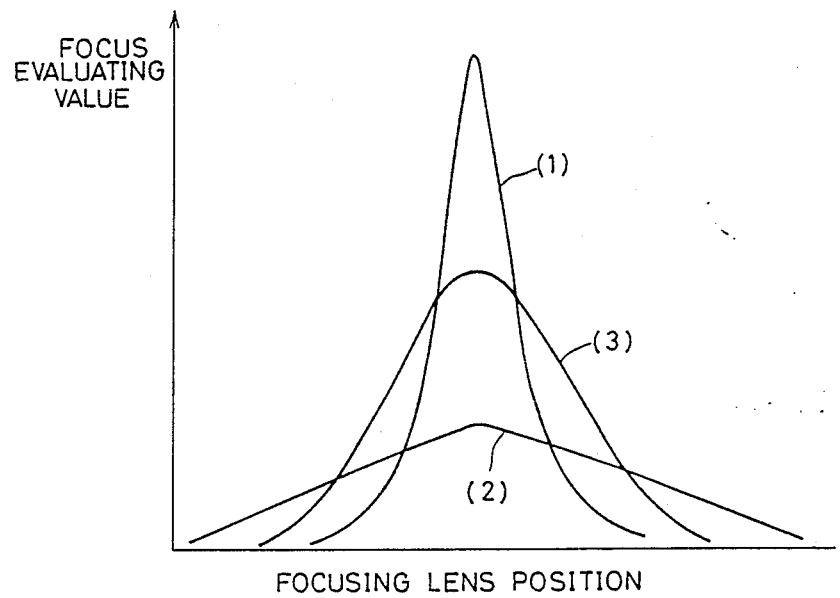
FIG. 19 is a graph for explaining the relation between the position of a focusing lens and the focus evaluating value.

Meanwhile, as described with reference to the second and third embodiments, in a video camera comprising a zoom mechanism, even if an image of the same object is recorded, the shape of the change of the focus evaluating value relative to the position of the lens extremely differs depending on whether the zoom is located in the telephoto region or the wide-angle region, as shown in FIG. 19. More specifically, when the zoom is located in the telephoto region, the focus evaluating value changes steeply as shown in FIG. 19 (1). On the other hand, if the zoom is located in the wide-angle region, the focus evaluating value changes very slowly as shown in FIG. 19 (2).

As seen from FIG. 19, when the zoom is located in the telephoto region, the depth of focus of the lens is small, so that the focus evaluating value extremely changes even if the distance between the lens and the object slightly changes. In addition, even if the distance between the lens and the object is unchangeable, the focus evaluating value extremely changes when the object moves laterally. Thus, if the focusing ring slightly moves, the focus evaluating value extremely changes, resulting in the defocused state. However, actually there are many cases where the distance between the lens and the object does not change very much. Therefore, in the above described embodiment, when the first focusing motor control circuit 15 outputs the lens stop signal LS so that the first automatic focusing operation is interrupted and then, the first focusing motor control circuit 15 resumes the first automatic focusing operation in response to an output of the comparator 21, it is desirable that the first automatic focusing operation is performed after the focus evaluating value extremely changes if hill-climbing servo operation is performed in the telephoto region. More specifically, it is desirable that a threshold value of the comparator 21 is set large.

Additionally, when the zoom is located in the wide-angle region, the depth of focus is so large that matching of focus is not required. Therefore, even if the lens slightly moves from an object, the sharpness of a picture does not change very much except an object close to the lens. If the focusing ring is moved under these conditions, the focus of the object does not change but only the angle of field changes, so that the very adverse effect is psychologically exerted. Thus, even in the wide-angle region, it is desirable that only when the focus evaluating value changes clearly, that is, the state of the object changes clearly, hill-climbing servo operation by the first focusing motor control circuit 15 is resumed. Thus, even in the wide-angle region, the threshold value of the comparator 21 must be set large for the first automatic focusing operation, for a different reason from that in the above described telephoto region.

On the other hand, in the intermediate region between the telephoto and wide-angle regions, the focus evaluating value changes in the intermediate state between the above described states (1) and (2), as shown in FIG. 19(3). More specifically, since the depth of focus is not very large and the focus evaluating value considerably changes relative to the movement of the object, automatic focusing operation must be performed in a fine manner to follow the movement of the object. Thus, the threshold value of the comparator 21 for resuming the first automatic focusing operation must be set to be smaller than those in the telephoto and wide-angle regions.

In other words, if the above described threshold value is set to a constant value assuming the telephoto and wide-angle regions, the first focusing motor control circuit 15 is not restarted in the intermediate region unless the recorded image is considerably defocused. On the other hand, if the above described threshold value is set to a constant value assuming the intermediate region, the recorded image is defocused although the object does not change in the telephoto region, and the angle of field changes although the sharpness of the picture does not change in the wide-angle region.

Figure 20:
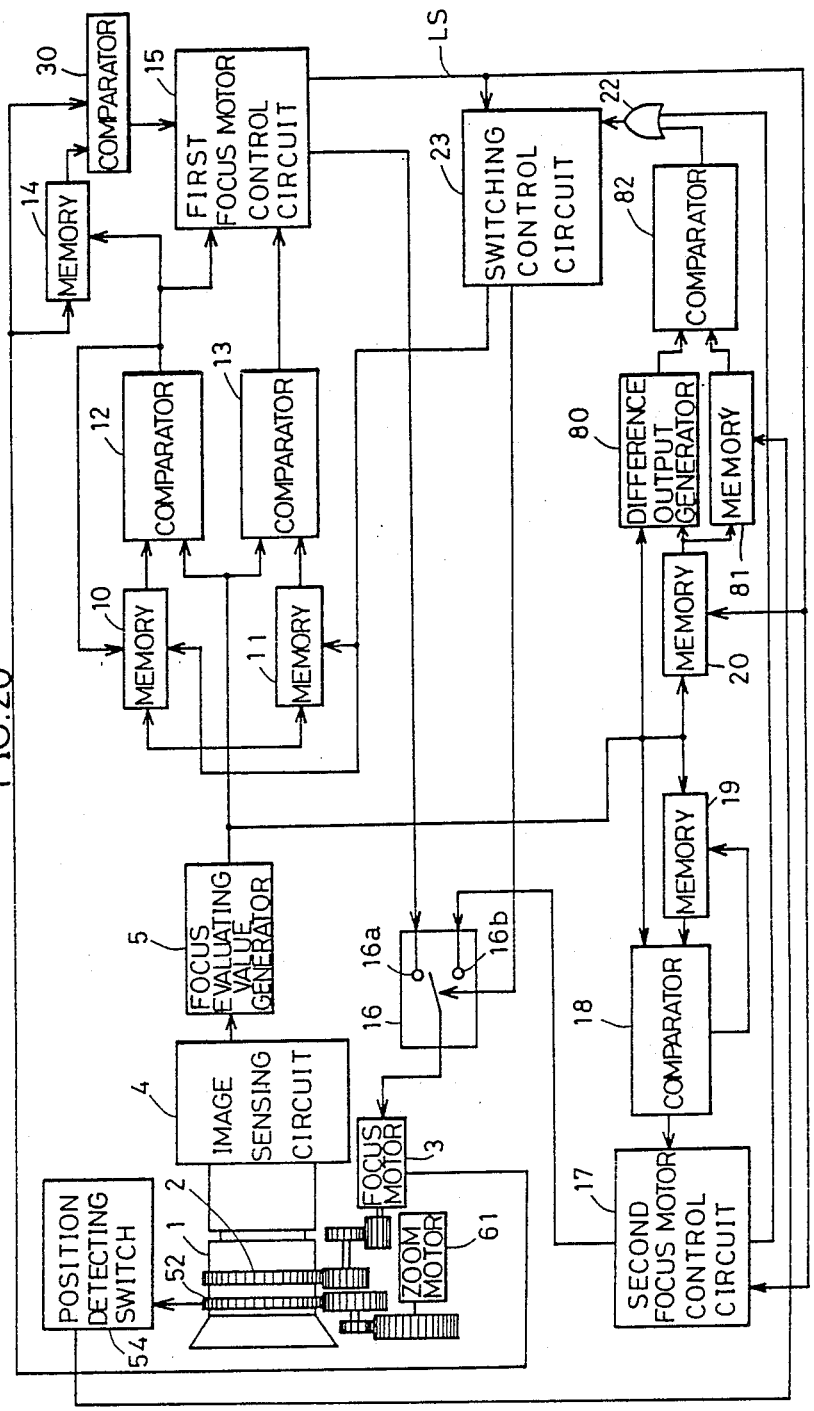
FIG. 20 is a schematic block diagram showing an automatic focusing circuit according to a fourth embodiment of the present invention.

FIG. 20 is a schematic block diagram of an automatic focusing circuit according to a fourth embodiment of the present invention, which object is to solve the above described problems. The automatic focusing circuit shown in FIG. 20 is the same as that in the third embodiment shown in FIG. 16 except for the following. More specifically, the automatic focusing circuit comprises a difference output generating circuit 80 for outputting the absolute value of the difference between a focus evaluating value held in a memory 20 and the current focus evaluating value outputted from a focus evaluating value generating circuit 5, a threshold value memory 81 receiving outputs of the memory 20 and a position detecting switch 54, and a comparator 82 for comparing outputs of the difference output generating circuit 80 and the threshold value memory 81. In addition, a zoom ring 52 shown in FIG. 20 is the same as that in the second embodiment shown in FIG. 10. Furthermore, FIG. 21 is a diagram for explaining a connecting relation of the position detecting switch 54.

When the zoom ring 52 is located on the wide-angle side, that is, an operating rod 54a abuts on a first stepped portion 53a and is located in a first position represented by a solid line A (in FIG. 21), terminals 55 and 56 are rendered conductive, so that rotational position information at "H" and "L" levels are supplied to input terminals 81a and 81b of the threshold value memory 81, respectively, whereby it can be known that a zoom lens is located in the wide-angle region.

Figure 21:
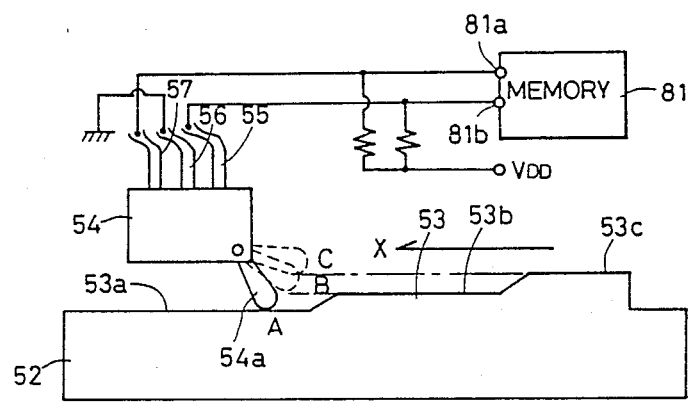
FIG. 21 is a diagram for explaining a connecting relation of a position detecting switch 54 in the fourth embodiment shown in FIG. 20.

When the zoom ring 52 rotates in the direction represented by an arrow X in FIG. 21, that is, on the telephoto side, the operating rod 54a slides along a cam portion 53 and abuts on a second stepped portion 53b. More specifically, the operating rod 54a moves to a second position represented by a dotted line B (in FIG. 21). As a result, terminals 55 and 57 are rendered conductive, so that rotational position information at the "H" and "H" levels are supplied to the input terminals 81a and 81b of the threshold value memory 81, respectively, whereby it can be known that the zoom lens is located in the intermediate region.

When the zoom ring 52 further rotates on the telephoto side, the operating rod 54a abuts on a third stepped portion 53c. More specifically, the operating rod 54a moves to a third position represented by a dotted line C (in FIG. 21). As a result, the terminals 56 and 57 are rendered conductive, so that rotational position information at the "L" and "H" levels are supplied to the input terminals 81a and 81b of the threshold value memory 81, respectively, whereby it can be known that the zoom lens is located in the telephoto region.

The threshold value memory 81 is responsive to a signal from the position detecting switch 54 for changing the output thereof. During automatic focusing operation by a second focusing motor control circuit 17, the comparator 82 compares the output of the difference output generating circuit 80 with the output of the threshold memory 81 which changes depending on the zoom position as described above. As a result, if the output of the difference output generating circuit 80 is larger than that of the threshold value memory 81, a signal indicating that an object changed is applied to a switching control circuit 23. Accordingly, the switching control circuit 23 switches a switching circuit 16 on the side of a terminal 16a. As a result, automatic focusing operation by a first focusing motor control circuit 15 is resumed.

More specifically, it is assumed that the maximal value of the focus evaluating value held in the memory 20 by a signal from the first focusing motor control circuit 15 is A. The difference output generator 80 calculates the absolute value $|A-A'|$ of the difference between the maximal value A and the current focus evaluating value A' outputted from the focus evaluating value generating circuit 5. On the other hand, the threshold value memory 81 outputs A/2 when a zoom position signal from the position detecting switch 54 indicates the telephoto and wide-angle regions and outputs A/4 when it indicates the intermediate region. The comparator 82 compares an output of the above described absolute value $|A-A'|$ with the output of the threshold value memory 81. If the following conditions are satisfied relative to the zoom position, in the telephoto region: $|A-A'|>A/2$
in the intermediate region: $|A-A'|>A/4$
in the wide-angle region: $|A-A'|>A/2$ the first focusing motor control circuit 15 is restarted.

Thus, according to the fourth embodiment, since the threshold value for restarting the first focusing motor control circuit 15 when an object is changed during automatic focusing operation by the second focusing motor control circuit 17 is automatically changed corresponding to the telephoto, intermediate and wide-angle regions, automatic focusing operation can be performed in a fine manner.

Figure 22:
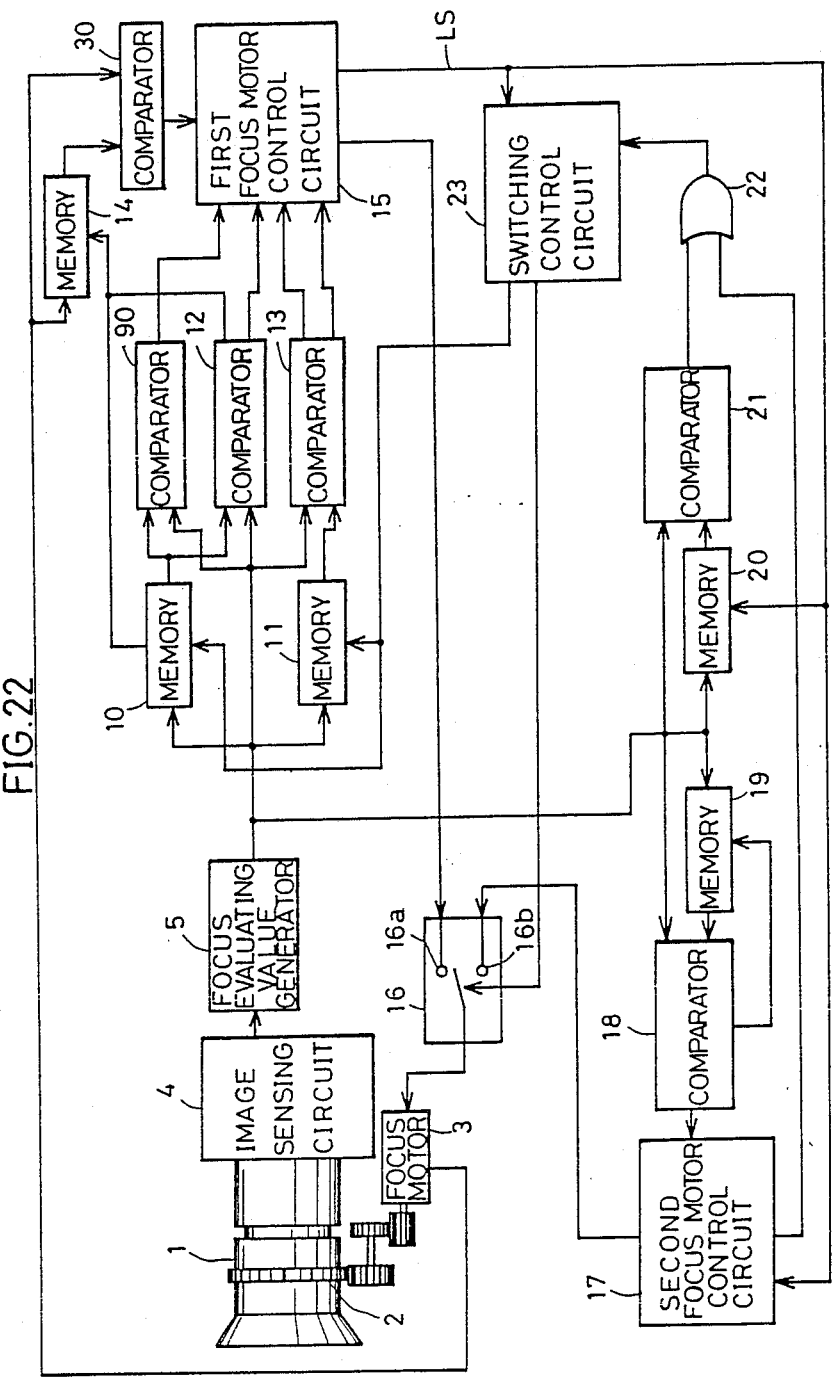
FIG. 22 is a schematic block diagram showing an automatic focusing circuit according to a fifth embodiment of the present invention.

FIG. 22 is a schematic block diagram showing an automatic focusing circuit according to a fifth embodiment of the present invention. The automatic focusing circuit shown in FIG. 22 is the same as that in the first embodiment shown in FIG. 3 except for the following. More specifically, a comparator 90 for receiving and comparing the content of a maximum value memory 10 with the current focus evaluating value outputted from a focus evaluating value generating circuit 5 is provided separately from a comparator 12.

In FIG. 22, when it is indicated that the current focus evaluating value is sufficiently smaller than the maximum focus evaluating value held in the maximum value memory 10 by an output of the comparator 12, a focusing motor 3 is immediately reversed. After the focusing motor 3 is reversed, updating of the value held in the maximum value memory 10 is stopped by an output of a first focusing motor control circuit 15, and a comparator 30 compares the content of a focusing motor position memory 14 with the current focusing motor position signal. When both coincide with each other, that is, a focusing ring 2 is returned to the position where the focus evaluating value becomes the maximum, the first focusing motor control circuit 15 functions such that the focusing motor 3 is stopped. Thus, after the focusing motor 3 is stopped, the first focusing motor control circuit 15 refers to an output of the comparator 90. If the difference between the content of the maximum value memory 10 whose updating is stopped after the focusing motor 3 is reversed and the current focus evaluating value is larger than a predetermined threshold value, a comparison signal at an "H" level is generated.

If a camera itself and an object are at rest, the focus evaluating value depends on only the position of the focusing ring 2. Therefore, at the time point when the focusing ring 2 is returned to the position where the focus evaluating value becomes the maximum the current focus evaluating value outputted from a focus evaluating value generating circuit 5 and the content of the maximum value memory 10 become almost equal, so that the comparator 90 should output a comparison signal at an "L" level. However, when the maximum value held in the maximum value memory 10 is not a true peak value due to unintentional movement of the hands and vigorous movement of an object, the current focus evaluating value is not equal to the content of the maximum value memory 10 even if the focusing ring 2 is returned to the original position, so that the comparison output of the comparator 90 attains the "H" level.

If the comparison output of the comparator 90 is at the "H" level as described above after the focusing ring 2 is reversed and stopped, the maximum value memory 10 and an initial value memory 11 are cleared so that automatic focusing operation by the first focusing motor control circuit 15 is performed from the beginning. In addition, if the comparison output of the comparator 90 is at the "L" level after the focusing ring 2 is reversed, the first focusing motor control circuit 15 outputs a lens stop signal LS, so that the second automatic focusing operation by a second focusing motor control circuit 17 is started as in the above described first embodiment.

As described in the foregoing, according to the above described fifth embodiment, since at the time point when the focusing ring is returned to the maximal point during hill-climbing servo operation and stopped therein, the current focus evaluating value and the maximal value being held are compared with each other so that the maximal point is reconfirmed, stable automatic focusing operation without malfunction due to unintentional movement of the hands of a camera and vigorous movement of an object can be achieved.

Meanwhile, in the above described embodiments, the focusing ring 2 is returned to the maximal point of the focus evaluating value by the comparator 30 and the first focusing motor control circuit 15 during first automatic focusing operation. However, for the following two reasons, it is difficult to correctly return the focusing ring 2 to the maximal point of the focus evaluating value.

One reason is that, after actual sensing of the object, a constant time period is required until the focus evaluating value in the corresponding position of the lens is actually outputted from the focus evaluating value generating circuit 5. For example, the focus evaluating value in a particular position A of the lens is outputted from the focus evaluating value generating circuit 5 after an optical image is sensed in an image sensor during one field period in the lens position A and then, is read out as a video signal during the next one field period. More specifically, the focus evaluating value in the particular lens position A is outputted two field period late. In other words, when the maximal value of the focus evaluating value is outputted from the focus evaluating value generating circuit 5 if the focusing motor 3 is moving, it is considered that the focusing ring 2 has actually overshot the maximal point. Thus, even if the focusing motor 3 is returned to the position of the motor when the maximal value of the focus evaluating value is outputted, the focusing ring 2 may not sufficiently returned.

The second reason is that even if the focusing motor 3 is reversed, motion is not transmitted to the focusing ring 2 by a certain amount immediately after reverse rotation, due to backlash of a driving system from the focusing motor 3 to the focusing ring 2. Therefore, even if the focusing motor is returned to the position of the motor in which the maximal value of the focus evaluating value is recorded, the focusing ring 2 may not sufficiently returned to the position showing the maximal value of the focus evaluating value.

As described in the foregoing, in the automatic focusing circuit according to the above described embodiments, when the focusing motor 3 is reversed after the focusing ring exceeds the point showing the maximal value of the focus evaluating value, the focusing ring is not sufficiently returned to the maximal point of the focus evaluating value due to delay of an output of the focus evaluating value, backlash of a focusing ring driving system or the like, so that exact automatic focusing operation can not be performed.

Figure 23:
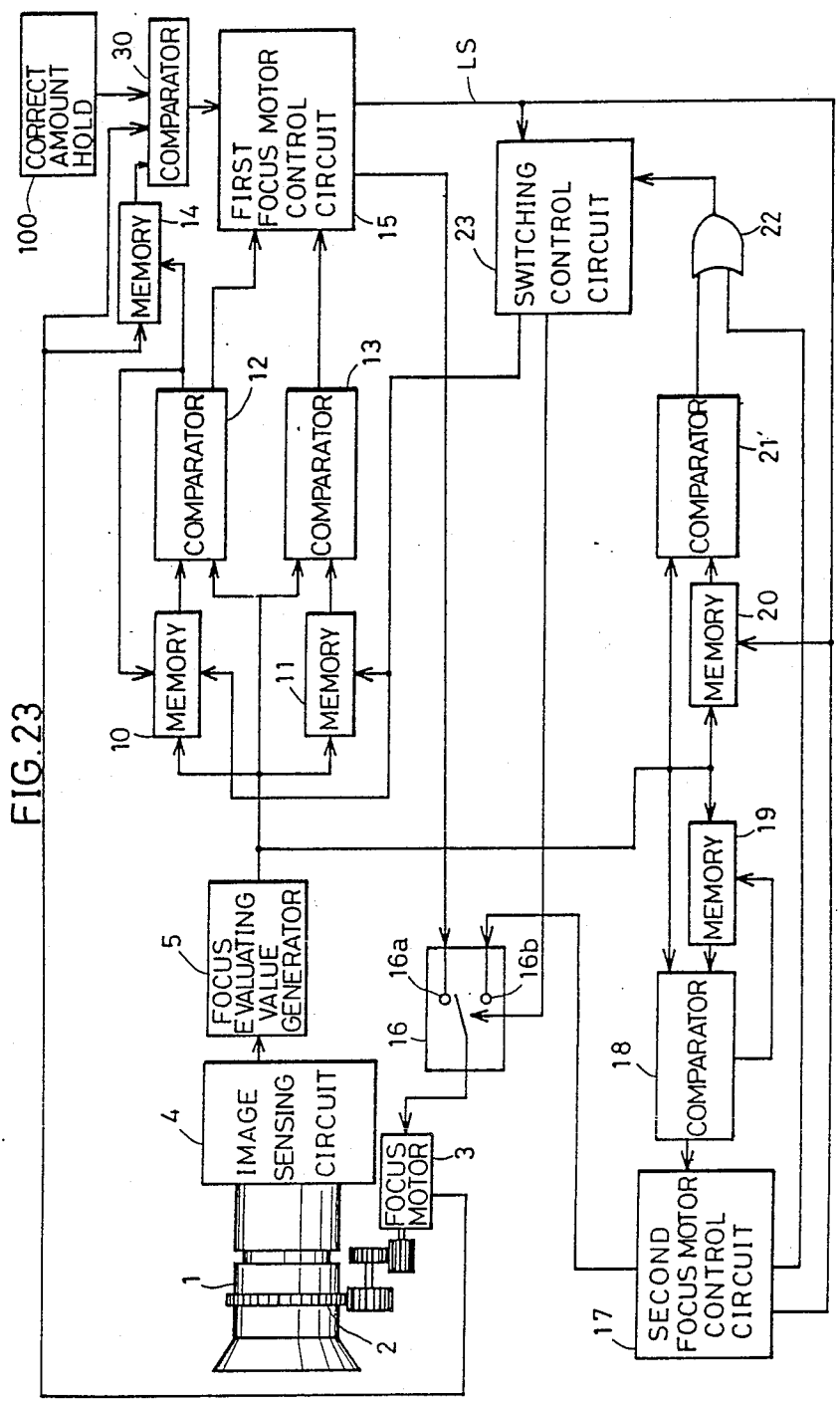
FIG. 23 is a schematic block diagram showing an automatic focusing circuit according to a sixth embodiment of the present invention.

FIG. 23 is a schematic block diagram showing an automatic focusing circuit according to a sixth embodiment of the present invention, which object is to solve the above described problems. The automatic focusing circuit shown in FIG. 23 is the same as that according to the first embodiment shown in FIG. 3 except that a correction amount holding circuit 100 is connected to a comparator 30. More specifically, the comparator 30 compares the content of a motor position memory 14 with the current focusing motor position signal. When both coincide with each other, a motor position coincidence signal is outputted to a first focusing motor control circuit 15 after a focusing motor 3 moves excessively by a predetermined correction amount applied from the correction amount holding circuit 100. Accordingly, the first focusing motor control circuit 15 functions to stop the focusing motor 3 assuming that a focusing ring 2 returns to the maximal point of a focus evaluating value and at the same time, outputs a lens stop signal LS.

A predetermined correction amount outputted from the correction amount holding circuit 100 is set to the sum of the moving amount of the focusing motor 3 during the above described delay time period of an output of the focus evaluating value and the amount of backlash between the focusing motor 3 and the focusing ring 2. Thus, according to the above described sixth embodiment, when the focusing ring 2 exceeds once the maximal point of the focus evaluating value and then, returns to the above described maximal point, insufficient return due to delay of the output of the focus evaluating value and backlash between the focusing motor and the focusing ring is not produced, so that correct automatic focusing operation can be achieved.

FIG. 24 is a schematic block diagram showing an automatic focusing circuit according to a seventh embodiment of the present invention. The automatic focusing circuit shown in FIG. 24 is the same as that in the first embodiment shown in FIG. 3 except that there are provided memories 101, 102 and 103 for holding focus evaluating values in a plurality of fields and an average value calculating circuit 104 for calculating the average value of the focus evaluating values in the plurality of fields. More specifically, after a focusing lens 1 is stopped by a first focusing motor control circuit 15, the focus evaluating values in three fields are held in the three memories 101, 102 and 103. Data stored in each of the memories is updated every one field. Thus, a focus evaluating value in a current field, a focus evaluating value one field before and a focus evaluating value two fields before are always held in the memories 101, 102 and 103, respectively. Data held in the memories 101, 102 and 103 are applied to the average value calculating circuit 104. The average value calculating circuit 104 calculates the average value of focus evaluating values in the newest three fields and applies the same to a comparator 18 and a memory 19. The content of the memory 19 is updated every one field. At that time, the average value of focus evaluating values from one field before to three fields before is held as a reference value in the memory 19. The comparator 18 compares the newest average value applied from the average value calculating circuit 104 with the reference value held in the memory 19. A second focusing motor control circuit 17 adjusts in a fine manner the position of the focusing lens in response to the result of comparison, as in the above described first embodiment.

As described in the foregoing, the change of a focus evaluating value is determined in response to the average value of the focus evaluating values in the plurality of fields, the change of the focus evaluating value by very small displacement of the position of the lens which does not affect a picture is surely determined without being affected by noise or the like. More particularly, if the change of the focus evaluating value is determined in response to the average value of focus evaluating values in a plurality of fields the number of which is a multiple of three reliable determination is made without being affected by flicker of 50 Hz of a fluorescent lamp.

Although in the above described embodiments, a signal taking the maximum value in the in-focus position is used as a focus evaluating value, a signal taking the minimum value in the in-focus position may be used as a focus evaluating value and a circuit for detecting the minimum value may be provided so that the minimal value of the detected value is maintained, in which case the same effect can be obtained.

In addition, although in the above described embodiments, the integration circuit 5$f$ is of an analog type, an integration circuit of a digital type which contains an A/D converter can be used.

Furthermore, operation in the above described embodiments can be easily processed in a soft ware manner by a microprocessor.

Additionally, although in the above described embodiments, the focusing motor position signal generated from the focusing motor 3 is held in the focusing motor position memory 14 and a focusing motor position signal corresponding to the maximum value of the focus evaluating value and the current focusing motor position signal are compared with each other by the comparator 30, a focusing ring position signal may be detected from the focusing ring 2 and used instead of the focusing motor position signal, in which case the same effect can be obtained.

Additionally, focus evaluating values may be detected not every one field but every one frame.

Additionally, if all of the above described first to seventh embodiments are implemented in a single automatic focusing circuit, very stable and reliable automatic focusing operation can be performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focusing circuit for automatically matching the focus in response to a video signal obtained from image sensing means having a focusing lens, a zoom lens, zoom lens moving means for moving said zoom lens in the direction of an optical axis and an image sensor, comprising:
   zoom position detecting means for detecting the zoom position of said zoom lens,
   focus evaluating value detecting means for detecting a level of a high frequency component of a video signal obtained from said image sensing means every constant period, converting the level into a focus evaluating value which takes the maximum value in the in-focus position or a focus evaluating value which takes the minimum value in the in-focus position and sequentially supplying the same, and
   focus control means connected to said zoom position detecting means and responsive to the change of the focus evaluating value supplied from said focus evaluating value detecting means for performing control in a predetermined characteristic so that said focusing lens is held in the in-focus position, said predetermined characteristic being switched in response to the zoom position detected by said zoom position detecting means;
   said focus control means including focusing lens position changing means for changing the relative position in the direction of the optical axis of said focusing lens relative to said image sensor;
   said focusing lens position changing means including a focusing ring for moving the focusing lens or the image sensor in the direction of the optical axis and a focusing motor.

2. An automatic focusing circuit according to claim 1, wherein said constant period is a period corresponding to one field of said video signal.

3. An automatic focusing circuit according to claim 1, wherein said constant period is a period corresponding to one frame of said video signal.

4. An automatic focusing circuit for automatically matching the focus in response to a video signal obtained from image sensing means having a focusing lens, a zoom lens, zoom lens moving means for moving said zoom lens in the direction of an optical axis and an image sensor, comprising:
  zoom position detecting means for detecting the zoom position of said zoom lens,
  focus evaluating value detecting means for detecting a level of a high frequency component of a video signal obtained from said image sensing means every constant period, converting the level into a focus evaluating value which takes the maximum value in the in-focus position or a focus evaluating value which takes the minimum value in the in-focus position and sequentially supplying the same, and
  focus control means connected to said zoom position detecting means and responsive to the change of the focus evaluating value supplied from said focus evaluating value detecting means for performing control in a predetermined characteristic so that said focusing lens is held in the in-focus position, said predetermined characteristic being switched in response to the zoom position detected by said zoom position detecting means;
  said focus control means including focusing lens position changing means for changing the relative position in the direction of the optical axis of said focusing lens relative to said image sensor;
  said focusing lens position changing means including a piezoelectric element for moving the focusing lens or the image sensor in the direction of the optical axis.

5. An automatic focusing circuit for automatically matching the focus in response to a video signal obtained from image sensing means having a focusing lens, a zoom lens, zoom lens moving means for moving said zoom lens in the direction of an optical axis and an image sensor, comprising:
  zoom position detecting means for detecting the zoom position of said zoom lens,
  focus evaluating value detecting means for detecting a level of a high frequency component of a video signal obtained from said image sensing means every constant period, converting the level into a focus evaluating value which takes the maximum value in the in-focus position or a focus evaluating value which takes the minimum value in the in-focus position and sequentially supplying the same, and
  focus control means connected to said zoom position detecting means and responsive to the change of the focus evaluating value supplied from said focus evaluating value detecting means for performing control in a predetermined characteristic so that said focusing lens is held in the in-focus position, said predetermined characteristic being switched in response to the zoom position detected by said zoom position detecting means;
  said focus evaluating value detecting means including:
    synchronizing signal separating means for separating a vertical synchronizing signal and a horizontal synchronizing signal from said video signal,
    gate means for passing every said constant period said video signal in a sampling area set in response to said vertical synchronizing signal and said horizontal synchronizing signal separated by said synchronizing signal separating means,
    filtering means for extracting a level of a high frequency component of the video signal which passed through said gate means,
    integrating means for integrating the level of the high frequency component of the video signal extracted by said filtering means, and
    analog/digital converting means for converting an output of said integrating means into a digital value.

6. An automatic focusing circuit for automatically matching the focus in response to a video signal obtained from image sensing means having a focusing lens, a zoom lens, zoom lens moving means for moving said zoom lens in the direction of an optical axis and an image sensor, comprising:
  zoom position detecting means for detecting the zoom position of said zoom lens,
  focus evaluating value detecting means for detecting a level of a high frequency component of a video signal obtained from said image sensing means every constant period, converting the level into a focus evaluating value which takes the maximum value in the in-focus position or a focus evaluating value which takes the minimum value in the in-focus position and sequentially supplying the same, and
  focus control means connected to said zoom position detecting means and responsive to the change of the focus evaluating value supplied from said focus evaluating value detecting means for performing control in a predetermined characteristic so that said focusing lens is held in the in-focus position, said predetermined characteristic being switched in response to the zoom position detected by said zoom position detecting means;
  said focus control means including focusing lens position changing means for changing the relative position in the direction of the optical axis of said focusing lens relative to said image sensor;
  said focus control means including first control means connected to said focus evaluating value detecting means for controlling said focusing lens position changing means so that the position of said focusing lens is once fixed in the position where said focus evaluating value takes the maximum value or the minimum value;
  said first control means further including:
    means for initializing the direction of the change of the relative position of said focusing lens immediately after said automatic focus matching operation is started,
    a first memory for always holding the maximum value of the minimum value of said focus evaluating value, held in said first memory with the focus evaluating value outputted from said focus evaluating value detecting means and determining that the position of said focusing lens passed through the position where said focus evaluating value takes the maximum value or the minimum value, and
    means responsive to determination by said first comparing means for reversing the direction of the change of the position of said focusing lens and controlling said focusing lens position changing means so that the position of said focusing lens is returned to the position where said focus evaluating value takes the maximum value or the minimum value.

7. An automatic focusing circuit according to claim 6, wherein
  said first comparing means determines that the position of said focusing lens passed through the position where said focus evaluating value takes the maximum value or the minimum value when the absolute value of the difference between the maximum value or the minimum value of the focus evaluating value held in said first memory and the focus evaluating value outputted from said focus evaluating value detecting means exceeds a predetermined threshold value, and
  said focus control means comprises means responsive to the zoom position detected by said zoom position detecting means for switching said threshold value.

8. An automatic focusing circuit according to claim 7, wherein said threshold value is the smallest when the zoom position is wide-angle and the largest when it is telephoto.

9. An automatic focusing circuit according to claim 6 wherein said focus control means comprises
  said focus control means comprises
  a second memory for holding said focus evaluating value at the time point when the position of said focusing lens is once fixed by said first control means,
  second comparing means for comparing the focus evaluating value held in said second memory with the focus evaluating value outputted from said focus evaluating value detecting means during operation by said second control means and indicating resumption of control of the position of the focusing lens by said first control means when the difference therebetween exceeds a predetermined threshold value, and
  means responsive to the zoom position detected by said zoom position detecting means for switching said predetermined threshold value.

10. An automatic focusing circuit as in claim 9, wherein said threshold value is large when the zoom position is in wide-angle and telephoto regions and small when it is in the intermediate region between the wide-angle and telephoto regions.

11. An automatic focusing circuit for automatically matching the focus in response to a video signal obtained from image sensing means having a focusing lens, a zoom lens, zoom lens moving means for moving said zoom lens in the direction of an optical axis and an image sensor, comprising:
  zoom position detecting means for detecting the zoom position of said zoom lens,
  focus evaluating value detecting means for detecting a level of a high frequency component of a video signal obtained from said image sensing means every constant period, converting the level into a focus evaluating value which takes the maximum value in the in-focus position or a focus evaluating value which takes the minimum value in the in-focus position and sequentially supplying the same, and
  focus control means connected to said zoom position detecting means and responsive to the change of the focus evaluating value supplied from said focus evaluating value detecting means for performing control in a predetermined characteristic so that said focusing lens is held in the in-focus position, said predetermined characteristic being switched in response to the zoom position detected by said zoom position detecting means;
  said focus control means including focusing lens position changing means for changing the relative position in the direction of the optical axis of said focusing lens relative to said image sensor;
  said focus control means including first control means connected to said focus evaluating value detecting means for controlling said focusing lens position changing means so that the position of said focusing lens is once fixed in the position where said focus evaluating value takes the maximum value or the minimum value;
  said focus control means further including:
    second control means for changing, by a very small amount, the position of said focusing lens and detecting the change of a focus evaluating value corresponding to the very small change after the position of said focusing lens is once fixed by said first control means and then, correcting the position of said focusing lens at the maximal point or the minimal point of said focus evaluating value,
    switching means for resuming controlling the position of the focusing lens by said first control means when the correction amount of the position of said focusing lens by said second control means exceeds a predetermined value, and
    means responsive to the zoom position detected by said zoom position detecting means for switching said predetermined value.

12. An automatic focusing circuit according to claim 11, wherein said second control means comprises
  means for changing the position of said focusing lens by a predetermined amount in a predetermined direction and comparing focus evaluating values before and after said change, and thereby determining the slope of a focus evaluating value,
  means for repeating the change by said predetermined amount until inversion of the slope of said focus evaluating value is detected, and thereby detecting the maximal point or the minimal point of said focus evaluating value, and
  means for controlling said focusing lens position changing means so that the position of said focusing lens is fixed at said detected maximal point or minimal point,
  the correction amount of the position of said focusing lens being defined by the number of repetitions of the change by a predetermined amount of the position of said focusing lens.

13. An automatic focusing circuit according to claim 11, wherein said predetermined value is the largest when a zoom is a wide-angle region and the smallest when it is a telephoto region.

14. An automatic focusing circuit for automatically matching the focus in response to a video signal obtained from image sensing means having a focusing lens, a zoom lens, zoom lens moving means for moving said zoom lens in the direction of an optical axis and an image sensor, comprising:
  zoom position detecting means for detecting the zoom position of said zoom lens,
  focus evaluating value detecting means for detecting a level of a high frequency component of a video signal obtained from said image sensing means every constant period, converting the level into a focus evaluating value which takes the maximum value in the in-focus position or a focus evaluating value which takes the minimum value in the in-focus position and sequentially supplying the same, and focus control means connected to said zoom position detecting means and responsive to the change of the focus evaluating value supplied from said focus evaluating value detecting means for performing control in a predetermined characteristic so that said focusing lens is held in the in-focus position, said predetermined characteristic being switched in response to the zoom position detected by said zoom position detecting means;

said focus control means including focusing lens position changing means for changing the relative position in the direction of the optical axis of said focusing lens relative to said image sensor;

said focus control means including first control means connected to said focus evaluating value detecting means for controlling said focusing lens position changing means so that the position of said focusing lens is once fixed in the position where said focus evaluating value takes the maximum value or the minimum value;

said focus control means further including:

a memory for holding said focus evaluating value at the time point when the position of said focusing lens is once fixed by said first control means, comparing means for comparing the focus evaluating value held in said second memory with the focus evaluating value outputted from said focus evaluating value detecting means after said focusing lens position is once fixed and indicating resumption of control of the position of the focusing lens by said first control means when the difference therebetween exceeds a predetermined threshold value, and means responsive to the zoom position detected by said zoom position detecting means for switching said predetermined threshold value.

15. An automatic focusing circuit according to claim 14, wherein said threshold value is large when the zoom position is in wide-angle and telephoto regions and small when it is in the intermediate region between the wide-angle and telephoto regions.

* * * * *